United States Patent
Cheung et al.

(10) Patent No.: US 12,355,494 B2
(45) Date of Patent: Jul. 8, 2025

(54) OPTICAL DEVICES AND SYSTEMS FOR OPTICAL SOURCE REDUNDANCY

(71) Applicant: HEWLETT PACKARD ENTERPRISE DEVELOPMENT LP, Spring, TX (US)

(72) Inventors: Stanley Cheung, Milpitas, CA (US); Geza Kurczveil, Santa Barbara, CA (US); Yiwei Peng, Spring, TX (US); Yuan Yuan, Milpitas, CA (US); Raymond G. Beausoleil, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 132 days.

(21) Appl. No.: 18/081,392

(22) Filed: Dec. 14, 2022

(65) Prior Publication Data
US 2024/0204881 A1    Jun. 20, 2024

(51) Int. Cl.
H04B 10/564    (2013.01)
G02F 1/313    (2006.01)
H04B 10/079    (2013.01)

(52) U.S. Cl.
CPC ......... *H04B 10/564* (2013.01); *G02F 1/3136* (2013.01); *H04B 10/0791* (2013.01); *H04B 10/07955* (2013.01)

(58) Field of Classification Search
CPC .............. H04B 10/564; H04B 10/0791; H04B 10/07955; G02F 1/3136
See application file for complete search history.

(56) References Cited

U.S. PATENT DOCUMENTS

| 6,160,932 A | 12/2000 | Huang et al. |
| 6,763,155 B2 | 7/2004 | Park et al. |
| 7,555,220 B2 | 6/2009 | Grubb et al. |

(Continued)

FOREIGN PATENT DOCUMENTS

CA    2341329 A1    9/2002

OTHER PUBLICATIONS

Cheung et al., "Ultra-power-efficient heterogeneous III-V/Si MOSCAP (de-)interleavers for DWDM optical links", Photonics Research, vol. 10, No. 2, Feb. 2022, 13 pages.

(Continued)

*Primary Examiner* — Pranesh K Barua
(74) *Attorney, Agent, or Firm* — Sheppard Mullin Richter & Hampton LLP

(57) ABSTRACT

Systems, devices, and methods are provided for built-in redundancy in optical devices that output an optical signal, for example, to photonic integrated circuits. The device and systems disclosed herein include a plurality of optical sources coupled to a plurality of waveguides. Each adjacent pair of the plurality of waveguides are coupled to an optical switching devices that comprises an interferometer having a first branch comprising a phase-shift mechanism coupled to one waveguide of the pair of waveguides. A voltage bias can be applied to the phase-shift mechanisms to tune a respective phase difference and direct an optical signal from any of the plurality of optical sources to the output end of the optical device. According to various examples disclosed herein, the phase-shift mechanisms comprises metal oxide semiconductor (MOS) capacitors.

20 Claims, 9 Drawing Sheets

(56) References Cited

U.S. PATENT DOCUMENTS

| | | | |
|---|---|---|---|
| 9,917,417 | B2 | 3/2018 | Li et al. |
| 10,481,463 | B2 | 11/2019 | Nejadriahi et al. |
| 2003/0039461 | A1 | 2/2003 | How Kee Chun et al. |
| 2014/0294344 | A1* | 10/2014 | Fondeur ............ H04Q 11/0005 385/17 |
| 2014/0334764 | A1 | 11/2014 | Galland et al. |
| 2015/0241633 | A1* | 8/2015 | Kusaka ................ G02F 1/2255 385/24 |
| 2019/0346685 | A1* | 11/2019 | Miller ..................... G02F 1/31 |
| 2020/0284989 | A1* | 9/2020 | Steinbrecher ...... G02B 6/29355 |
| 2020/0319409 | A1 | 10/2020 | Su et al. |
| 2020/0401012 | A1 | 12/2020 | Xu et al. |
| 2022/0091473 | A1* | 3/2022 | Yamaguchi ........... G02F 1/3136 |
| 2022/0269972 | A1* | 8/2022 | Bandyopadhyay .... H04B 10/70 |
| 2022/0286208 | A1* | 9/2022 | Wang ................ H04B 10/5051 |

OTHER PUBLICATIONS

D. Che, Y. Matsui, X. Chen, R. Schatz, and P. Iannone, "400-GB/s direct modulation using a DFB+R laser," Opt. Lett., vol. 45, No. 12, p. 3337, Jun. 2020, doi: 10.1364/OL.392873.

Davenport et al., "Integrated heterogeneous silicon/III-V mode-locked lasers", Photonics Research, vol. 6, No. 5, May 2018, 11 pages.

G. Kurczveil, A. Descos, D. Liang, M. Fiorentino, and R. Beausoleil, "Hybrid Silicon Quantum Dot Comb Laser with Record Wide Comb Width," Frontiers in Optics, p. 2, 2020.

G. Kurczveil, M. A. Seyedi, D. Liang, M. Fiorentino, and R. G. Beausoleil, "Error-Free Operation in a Hybrid-Silicon Quantum Dot Comb Laser," IEEE Photonics Technology Letters, vol. 30, No. 1, pp. 71-74, Jan. 2018, doi: 10.1109/LPT.2017.2775145.

G. Kurczveil, X. Xiao, A. Descos, S. Srinivasan, D. Liang, and R. Beausoleil, "High-temperature error-free operation in a heterogeneous silicon quantum dot comb laser," presented at the OFC, 2022.

HPE, "On-chip Hybrid Silicon Quantum Dot Comb Laser With 14 Error Free Channels", 2018, 3 pages.

Liang et al., "Heterogeneous silicon light sources for datacom applications", Optical Fiber Technology, 2018, 10 pages.

P. Bardella and I. Montrosset, "A New Design Procedure for DBR Lasers Exploiting the Photon-Photon Resonance to Achieve Extended Modulation Bandwidth," IEEE Journal of Selected Topics in Quantum Electronics, vol. 19, No. 4, pp. 1502408-1502408, Jul. 2013, doi: 10.1109/JSTQE.2013.2250260.

Soref et al., "Electrooptical effects in silicon", IEEE Journal of Quantum Electronics, vol. 23, No. 1, Jan. 1987, pp. 123-129.

* cited by examiner

OPTICAL DEVICES AND SYSTEMS FOR OPTICAL SOURCE REDUNDANCY

STATEMENT OF GOVERNMENT RIGHTS

This invention was made with Government support under Agreement Number H98230-18-3-0001. The Government has certain rights in the invention.

BACKGROUND

In order to overcome challenges due to rapidly growing traffic, high-performance computers demand highly dynamic data rates, e.g., a few terabytes per second communication bandwidth between switch hubs or hundreds of gigabytes per second bandwidth between nodes and hubs. Photonic integrated circuits (PICs) provide a solution for low-cost, energy efficient, and high-speed data communications because of advantages provided in high-volume throughput and dense integration within a system. Applied with signal multiplexing techniques, e.g., wavelength division multiplexing (WDM), large bandwidth data links may be achievable, for example, on silicon platforms. In such a system, an on-chip, robust, low-power consumption laser source is an important component to the operation of PICs.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
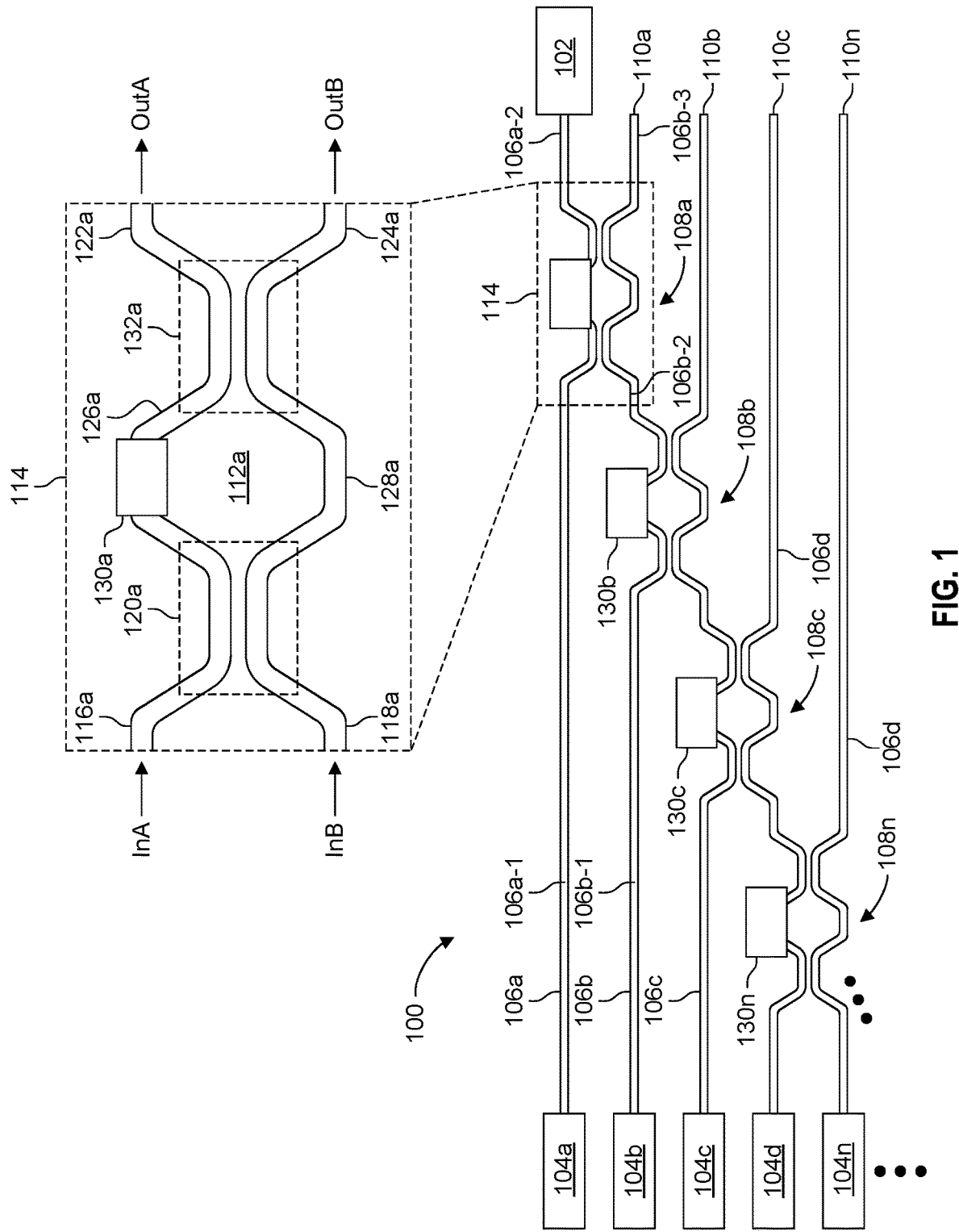
FIG. 1 depicts a schematic diagram of an optical device in accordance with implementations disclosed herein.

The figures are not exhaustive and do not limit the present disclosure to the precise form disclosed.

DETAILED DESCRIPTION

As alluded to above, a photonic integrated circuit (PIC) chip (which may also be referred to herein simply as a chip) may rely on an optical supply, which may be internal or external to the PIC, to provide optical energy (also referred to herein as an optical signal or light) used by the PIC to communicate with other devices chip-to-chip, board-to-board, shelf-to-shelf, rack-to-rack, or network-to-network. Advancements in semiconductor platforms, such as silicon-based platforms, have led to component integration in which an optical supply can be integrated into PIC chip without a sub-assembly approach, in which an optical supply is separately fabricated from and attached to the PIC chip. The sub-assembly approach can be complex, results in lower fabrication volumes in numbers of produced chips, and can be very costly. Integration of the optical supply into the PIC chip can lead to increased energy efficiency (e.g., through reduced power consumption) and increased data rates.

An optical supply may utilize optical sources that have a limited lifespan to generate the optical energy. A malfunctioning optical supply may cause the PIC to malfunction, and thereby may bring down a computing system relying on operations of the PIC as well as affecting any other computing systems in the network. Furthermore, if the PIC fails, the entire chip on which the PIC is provided may need to be discarded and replaced.

Thus, a robust, lower power consumption optical supply may be important to the operation of PICs. An optical supply with built-in redundancy can assist with quality assurance and ensure seamless operation of the optical network. Accordingly, example implementations disclosed herein provide for optical devices and systems configured to provide redundancy in optical energy (e.g., an optical signal) supplied to a PIC chip. For example, implementations disclosed herein provide for seamless switching from a first optical source generating an optical signal that is supplied to a PIC chip to a second optical source upon detection of failure or malfunctioning in the first optical source. Some implementations disclosed herein comprise a plurality of optical sources such that optical energy supplied to the PIC chip can be switched from a first optical source to an $N^{th}$ optical source of the plurality of optical sources upon detection of failure in each successive optical source from the first to the $N^{th}+1$ optical source.

A seamless switch over, according to examples of the disclosed technology, can be achieve through use of sequentially cascaded optical switching devices, each of which is coupled to a pair of the plurality of optical sources. For example, a first optical source may generate a first optical signal that is provided to a first input of a first optical switching device and a second optical source may generate a second optical signal provided to a second input of the first optical switching device; the second optical signal may also be supplied to a first input of a second optical switching device and a third optical source may generate a third optical signal supplied to a second input of the second optical switching device; and so on to an $N^{th}-1$ optical switching device and an $N^{th}$ optical source. Thus, according to various implementations disclosed herein, there may be one less optical switching device than optical sources. By tuning the coupling coefficients of one or more optical switching devices responsive to detecting a failure of one or more optical sources, the optical signal supplied to the PIC chip can be switched to a successively next optical source. Thus, implementations disclosed herein provide for built-in redundancy in the optical supply to ensure seamless operation of the PIC chip and downstream computing systems.

Furthermore, example implementations of the disclosed technology can provide for low power consumption while providing for the switch over between optical sources. For example, each of the plurality of optical switching devices may comprise a phase-shift mechanism coupled thereto. The phase-shift mechanism may be adapted to induce a phase difference between optical signals traversing the optical switching device. Controlled tuning of the phase difference changes one or more splitting ratios within the optical switching device, thereby controlling which optical source is directed to the PIC chip. For example, a first splitting ratio for a first optical source may direct a first optical signal to the PIC chip and a second splitting ratio for a second optical source may direct a second optical signal away from the PIC chip. Upon detecting a failure in the first optical source, the phase-shift mechanism can be tuned to alter each splitting ratio so to direct the first optical signal away from the PIC chip and the second optical signal to the PIC chip. The process can be repeated for each successive optical source upon detection of a failure in a preceding optical source.

According to various implementations, the phase-shift mechanisms may be provided as metal-oxide-semiconductor capacitors (MOSCAP) coupled to a branch of a Mach-Zehnder Interferometer (MZI) (referred to herein as a MOSCAP-loaded MZI), where each optical switching device is implemented as a MZI in this example. MOSCAP-loaded MZIs can be switched on and off with microWatts of power and consume nearly 0 Watts of static power when operated as a non-volatile element. Conventional heater-based phase shifters consume milliWatts of power and the power consumption scales linearly with the number of failed optical sources. While power consumption may scale linearly as well in the implementations disclosed herein, such power consumption will be negligible since the consumption by each MOSCAP-loaded MZI is negligible (e.g., microWatts compared to milliWatts).

Accordingly, the implementations disclosed herein provide for an energy efficient optical source redundant scheme having significant benefits over conventional systems, thereby improving the reliability of PIC chips, as well as other optical networks, such as large scale optical neural networks, optical machine learning architectures, programmable photonic networks, and radio frequency (RF)-photonics.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As used herein "approximately" and "generally" refer to permissible variations in properties of the implementations disclosed herein. Implementations disclosed herein may have certain properties, attributes, and/or characteristics that include some acceptable variation that does not significantly affect the functioning of the disclosed implementations.

FIG. 1 depicts a schematic diagram of an optical device 100 in accordance with implementations disclosed herein. The optical device 100 may be implemented as an optical supply, for example, utilized to supply an optical signal to a PIC 102 coupled to an output of the optical device. PIC 102 may include integrated optical and electronic components. PIC 102 may be utilized for many different applications, such as, but not limited to, datacom, telecom, biological sensing, optical neural networks, optical machine learning architectures, programmable photonic networks, RF-photonics, and so on. Optical device 100 may include electrical and optical components to form a switch, a router, or a similar system.

The optical device 100 comprises a plurality of optical sources 104a-n (collectively referred to herein as optical sources 104) that emit optical signals into a plurality of waveguides 106a-n (collectively referred to herein as waveguides 106). Each of the plurality of waveguides 106 guide propagation of an optical signal, such as a lasing mode, from a corresponding optical source 104. Optical device 100 also comprises a plurality of optical switching devices 108a-n (collectively referred to herein as optical switching device 108), each of which is formed along adjacent pairs of waveguides 106. Optical switching devices 108 are adapted to control which optical source 104 supplies a corresponding optical signal to the PIC 102 coupled to an output of one of the waveguides 106.

In the example shown in FIG. 1, the waveguides 106 supply an optical signal to either PIC 102 or terminate at a terminator 110a-n (collectively referred to herein as terminators 110) at output ends of waveguides 106. For example, first optical source 104a may be a primary optical source that provides a first optical signal to the PIC 102 via first waveguide 106a. First optical switching device 108a can be controlled to steer the first optical signal propagating in a first section 106a-1 of waveguide 106a into a second section 106a-2 of first waveguide 106a. If first optical source 104a fails or otherwise malfunctions, first and second optical switching devices 108a and 108b can be controlled to supply a second optical signal from second optical source 104b to the PIC 102, while steering the first optical signal emitted by the first optical source 104a to the terminator 110a. For example, second optical switching device 108b can be controlled to steer the second optical signal propagating in a first section 106b-1 of waveguide 106b into a second section 106b-2 of second waveguide 106b, which supplies the second optical signal from second optical source 104b to the first optical switching device 108a. First optical switching device 108a can also be controlled to steer the second optical signal propagating in the second section 106b-2 into the second section 106a-2 of first waveguide 106, thereby supplying the second optical signal emitted by second optical source 104b to the PIC 102. The first optical signal emitted by first optical source 104a is also steered via first optical switching device 108a into a third section 106b-3 of second waveguide 106b, which supplies the optical signal emitted by the first optical source 104b to terminator 110a. If the second optical source 104b fails or otherwise malfunctions, the procedure repeats to supply an optical signal emitted by the sequentially next optical source (e.g., third optical source 104c) to PIC 102 by controlling the next optical switching device collectively with preceding optical switching devices (e.g., optical switching devices 108a-c). This procedure can be repeated for each optical source failure up until optical source 104n.

In various implementations, optical device 100 is a silicon-based photonic chip formed on a silicon-on-insulator (SOI) platform, where the optical switching devices 108 are formed on a silicon substrate. In some examples, optical sources 104 can also be formed on the silicon substrate. In another example, one or more optical sources 104 may be discrete components mounted on the silicon photonic chip. In various implementations, the optical device 100 and PIC 102 may be formed on a common silicon substrate, thereby being integrated on a single chip.

Optical sources 104 may be tunable lasers, such as vertical-cavity side-emitting lasers (VCSELs), distributed-feedback (DFB) lasers, distributed Bragg reflector (DBR) lasers, mode-locked lasers, comb lasers, or the like. In various implementations, the optical sources 104 are implemented as single frequency lasers. In various implementations, each optical source 104 generates an optical signal having approximately the same wavelength across optical sources 104 (e.g., optical sources 104 emit light at a common wavelength). In another implementation, optical sources 104 generate optical signals having one or more different wavelengths, and, in some examples, each optical source 104 generates an optical signal having a different wavelength from the other optical sources 104. In some implementations, one or more of the optical sources 104 may be tunable optical sources configured to generate optical signals having a tunable wavelength. Other types of solid-state lasers able to meet wavelength requirements of the optical components as well as the phototransistors may be used.

Terminators 110 may be non-reflecting optical components. For example, terminators 110 may be implemented as an absorber or radiator. Terminators 110 can be provided such that any light reaching a terminator 110 does not generate an unwanted reflection back into the corresponding waveguide 106 that could propagate further back into other parts of optical device 100.

In various implementations, one or more optical switching devices 108 may be implemented as a Mach-Zehnder interferometer (MZI), which can advantageously be utilized for steering light from optical sources 104 toward a desired end point (e.g., PIC 102 or one of terminators 110). In various implementations, each MZI can be etched into silicon on a SOI substrate. Use of MZIs as optical switching devices will now be described with reference to enlarged view 114 of a portion 134, which depicts a close-up view of optical switching device 108a as an illustrative example of optical switching devices 108 implemented as MZIs.

As alluded to above, optical switching devices 108a may be implemented as a MZI 112a, which receives a first input optical signal InA and a second input optical signal InB into first input 116a and second input 118a, respectively, and steers one of the inputs optical signals into a first output 122a and the other input optical signal into second output 124a. In the case of optical switching device 108a, first input optical signal InA is the optical signal emitted by the first optical source 104a propagating on first waveguide 106a and second input optical signal InB is the optical signal propagating on second portion 106b-2 of second waveguide 106b, for example, received from optical switching device 108b. First input 116a and second input 118a feed into a directional coupler 120a, which mixes input optical signals InA and InB from inputs 116a and 118a into a first branch 126a and a second branch 128a of the MZI 112a. In the case of optical switching device 108a, first input 116a, the first branch 126a, and branch 128a may be formed of the first waveguide 106a and second input 118a, second branch 128a, and first output 124a may be formed of the second waveguide 106b. An optical signal propagating in first waveguide 106a can be evanescently coupled into second waveguide 106b based on a coupling efficiency of the directional coupler 120a and vice versa, thereby mixing the input optical signals InA and InB.

Optical switching device 108a also comprises at least one phase-shift mechanism 130a coupled to one of branches 126a and 128a, thereby providing a phase-shift mechanism loaded MZI 112a. The phase-shift mechanism 130a can be tuned to steer one input optical signal onto first output 122a and the other input optical signal onto second output 124a.

For example, phase-shift mechanism 130a may be implemented to induce a phase delay (also referred to as a phase difference) between the input optical signals traversing in the branch 126a and branch 128a. In the illustrative example shown in FIG. 1, the phase-shift mechanism 130a is coupled to branch 126a; however, the first at least one phase-shift mechanism 130a may be provided along either branch 126a or branch 128a. Furthermore, in some implementations, one or more additional phase-shift mechanisms may be included in the other branch, or multiple phase-shift mechanisms may be included on one or either branch, depending on the implementation.

In the illustrative example of FIG. 1, phase-shift mechanism 130a can be controlled to tune a relative phase delay between first branch 126a and second branch 128a by inducing a phase shift in the branch coupled to the phase-shift mechanism 130a. For example, phase-shift mechanism 130a can be utilized to tune a relative phase difference between first branch 126a and second branch 128a by inducing a phase shift in an optical signal prorogating in branch 126a.

Optical signals that are output from directional coupler 120a and phase delayed by phase-shift mechanism 130a continue into a directional coupler 132a. Directional couplers 120a and 132a, with adjustable phase delays introduced by phase-shift mechanism 130a, form a MZI that causes constructive or destructive interference between branches 126a and 128a. The selective control of the constructive and destructive interference can be used to steer one of input optical signals InA and InB onto first output 122a and the other input optical signal onto second output 124a. First output 122a supplies an output optical signal OutA onto second section 106a-2 of first waveguide 106a and ultimately to the PIC 102. While second output 124a supplies an output optical signal OutB onto third section 106b-3 of second waveguide 106b and ultimately to terminator 110a. Accordingly, tuning the phase delay via the phase-shift mechanism 130a controls which optical signal is output onto the first output 122a and ultimately to the PIC 102. The implementation of phase-shift mechanism 130a can vary and may be provided as any mechanism capable of inducing a phase shift in light propagating through a respective waveguide; for example phase-shift mechanism may be implemented using thermal tuning, carrier injection, and/or other electro-optical effects. Further details regarding example implementations of first phase-shift mechanism 130a are provided below in connection with FIGS. 3A-4.

In addition to the directional couplers illustrated in FIG. 1, which are shown as 2×2 directional couplers, other optical couplers can be utilized including 2×2 multimode interference coupler (MMI), grating based power splitters, or the like. The optical couplers (e.g., the directional couplers or other optical couplers) utilized in embodiments of the present disclosure can be tunable to cover a desired tuning range over which input source wavelengths may vary. Thermal tuning, electro-optic tuning, and other tuning mechanisms can be utilized in addition to multi-stage optical couplers to provide the desired tuning range. Moreover, in addition to MZIs based solely on directional couplers, other MZI configurations and other switches can be utilized such as ring resonator-based switches, Fabry-Perot resonator-based switches, and the like. The MZI approach may offer advantages due to ease of implementation and robustness in regards to operation and fabrication.

According to various implementations, optical switching device 108a can function as a tunable directional coupler based on tuning of phase-shift mechanism 130a. For example, tuning the relative phase difference between branch 126a and branch 128a via phase-shift mechanism 130a provides for tuning a splitting ratio (r) that controls optical power supplied to each output 122a and 124a. The splitting ratio may refer to the ratio of the optical power output at first output 122a over the optical power output at second output 124a according to an input optical power. Thus, a first splitting ratio may be the ratio optical power of the first input optical signal InA from first input 116a that is output from first output 122a over the optical power of the first input optical signal InA output from second output 124a. A second splitting ratio may be similarly determined for the second input optical signal InB from second input 118a. The first and second splitting ratios may be reciprocally related, such that when the first splitting ratio is zero, the second splitting ratio is one and vice versa. In the case that the first splitting ratio is set to one (e.g., second splitting ratio is zero), all the optical power from the first input 116a is supplied to first output 122a and all the optical power from the second input 118a is supplied to second output 124a. A splitting ratio of one can be achieved tuning the relative phase difference between branch 126a and branch 128a to 270° (e.g., 3π/2 radians). Alternatively, when the first splitting ratio (r) is zero (e.g., second splitting ratio is one), all the optical power from second input 118a is supplied to first output 122a and all the optical power from the first input 116a is supplied to second output 124a. A splitting ratio of zero can be achieved tuning the relative phase difference between branch 126a and branch 128a to 90° (e.g., π/2 radians). Thus, phase-shift mechanisms 130a can be tuned to select which input optical signal InA, InB is supplied to first output 122a or second output 124a.

As noted above, the details of optical switching device 108a shown in enlarged view 114, is provided as an illustrative example. The other optical switching devices 108b-n may be substantively similar to the optical switching device 108a. For example, each optical switching devices 108b-n can include a first input similar to first input 116a; a second input similar to second input 118a; a first branch similar to first branch 126a; a second branch similar to second branch 128a; a first output similar to first output 122a, and a second output similar to second output 124a. Furthermore, each first input, first branch, and first output may be formed of a one waveguide of waveguides 106 and each second input, second branch, and second output may be formed of another waveguide of waveguides 106. For example, in the case of optical switching device 108b, first input, first branch, and first output may be formed of a waveguides 106b and second input, second branch, and second output may be formed of waveguide 106c. As shown in FIG. 1, first output of optical switching device 108b may be coupled to second input 118a of optical switching device 108a. That is, first outputs of each successive optical switching device 108 can be coupled to a second input of a preceding optical switching devices 108, thereby forming a cascaded structure of optical switching devices 108 that can be operated to steer an optical signal to the PIC 102.

The cascaded structure of optical device 100 can be operated to steer an optical signal emitted by any one of the optical sources 104 to the PIC 102. For example, each first input of each optical switching device 108 receives a first input optical signal InA from a successive optical source 104 and each second input receives a second input optical signal InB from a successively next optical source 104. For example, as described above, first input 116a of first optical switching device 108a is formed of first waveguide 106a that receives a first input optical signal InA from first optical source 104a, and second input 118a is formed of second waveguide 106b that receives a second input optical signal InB from optical switching device 108b. Similarly, second optical switching device 108b comprises a first input formed of second waveguide 106b that receives a first input optical signal InA from second optical source 104b, and a second input formed of third waveguide 106c that receives a second input optical signal InB from third optical switching device 108c. Third optical switching device 108c comprises a first input formed of third waveguide 106c that receives a first optical signal InA from third optical source 104c, and a second input formed of fourth waveguide 106d that receives a second input optical signal InB from fourth optical switching device 108n. Fourth optical switching device 108n comprises a first input formed of fourth waveguide 106d that receives a first input optical signal InA from fourth optical source 104d. In the illustrated in the example of FIG. 1, the fourth optical switching device 108n may also have a second input formed of fifth waveguide 106n that receives a second input optical signal InB from an N$^{th}$ optical source 104n.

Any number of optical sources may be included in the optical device 100. In the case of the last of optical source 104 (e.g., N$^{th}$ optical source 104n in this example), the last optical source 104 supplies an optical signal into a second input of a respective optical switching devices 108 and does not supply an optical signal into a first input of a next optical switching devices 108 because there is no next optical switching device. Thus, for example, if fourth optical source 104d is to be the last optical source, fourth optical switching device 108n could be removed such that fourth optical source 104d only supplies light into the second input of third optical switching device 108c.

Each optical switching device 108 may comprise at least one phase-shift mechanism 130a-n (collectively referred to herein as at least one phase-shift mechanisms 130), each of which are substantively similar to first at least one phase-shift mechanism 130a described above. As a result, each of phase-shift mechanisms 130 can be individually controlled to tune a relative phase delay between a first branch and a second branch of a corresponding optical switching device 108, for example, by inducing a phase shift in a branch coupled to each respective phase-shift mechanism 130. Based on the tuning of the optical switching devices 108, an optical signal emitted by one of the optical sources 104 can be ultimately supplied to the second section 106a-2 of first waveguide 106a and to PIC 102, while optical signals emitted by other optical sources 104 are provided to one of terminators 110.

Tuning of one or more of the phase-shift mechanisms 130 may be executed in response to detecting a failure or other malfunction in one or more of the optical sources 104 so as to direct optical signals from the one or more malfunctioning optical sources 104 to terminators 110 and direct a properly functioning optical source 104 to the PIC 102. For example, a properly functioning optical sources 104 will emit an optical signal that traverses a first section of a respective waveguide 106 and can be directed to second section 106a-2 of first waveguide 106a via one or more optical switching devices 108 positioned along an optical path between the functioning optical source 104 and the PIC 102. That is, for example, in the case of that optical sources 104a-c have failed and fourth optical source 104d is functioning as expected, an optical signal emitted by fourth optical source 104d propagates along fourth waveguide 106d and is input into fourth optical switching device 108n via a first input of fourth optical switching device 108n. Based on tuning fourth optical switching device 108n, the optical signal that originated from first optical source 104*a* is supplied to a second input of third optical switching device 108*c*, which is provided to a first output of the third optical switching device 108*c* based on tuning third optical switching device 108*c*. The optical signal that originated from optical source 104*d* proceeds to a second input of the optical switching device 108*b*, which outputs the optical signal onto a first output of optical switching device 108*b* based on tuning of optical switching device 108*b*. A second input of optical switching device 108*a* then receives the optical signal that originated from first optical source 104*a* via the first output of optical switching device 108*b* and supplies the optical signal to the PIC 102 via second section 106*a*-2 of first waveguide 106*a* based on tuning optical switching device 108*a* so to supply the optical signal to a first output of optical switching device 108*a*. In this scenario, optical signals emitted by optical sources 104*a-c* are directed to terminators 110*a-c*, respectively.

In various implementations, the PIC 102 can comprise a sensor configured to monitor an optical signal received at the PIC 102. For example, the PIC 102 may comprise a photodetector that is provided to detect the optical signal received at the PIC 102. The PIC 102 can use the sensor to determine whether or not the received optical signal satisfies conditions indicative of a properly functioning optical source. For example, the sensor may detect optical characteristics (e.g., intensity, amplitude or the like) of the received optical signal, which can be used to monitor the optical signal, for example, via a feedback circuit. Additional details on example feedback circuits are provided below in connection with FIGS. 2 and 5. For example, if the intensity (or amplitude) of an optical signal received at the sensor is below a defined threshold intensity (or amplitude), the PIC 102 may determine that the optical source emitting the optical signal has malfunctioned or failed. The PIC 102 can then notify the monitoring circuit of the malfunction or failure, and the feedback circuit can activate another optical source and tune respective optical switching devices 108 to direct an optical signal from the other optical source to the PIC 102. The feedback circuit may also reactivate the malfunctioning optical source.

In some implementations, it may be difficult to optimally tune the plurality optical switching devices 108 so to maximize the optical power supplied to the PIC 102. For example, if a particular $N^{th}$ optical switching device 108 is to be in a certain bias state, it may be difficult to do this without monitoring the output of the optical switching devices, including the $N^{th}$ switching device. Accordingly, implementations disclosed herein can include feedback circuits and detectors to monitor optical signals emitted by the optical sources 104 and control the optical switching devices 108 so to maximize the optical signal directed to the PIC 102. Having the feedback circuits disclosed herein enables monitoring the outputs to make the tunning of the $N^{th}$ optical switching device 108 more tractable.

Figure 2:
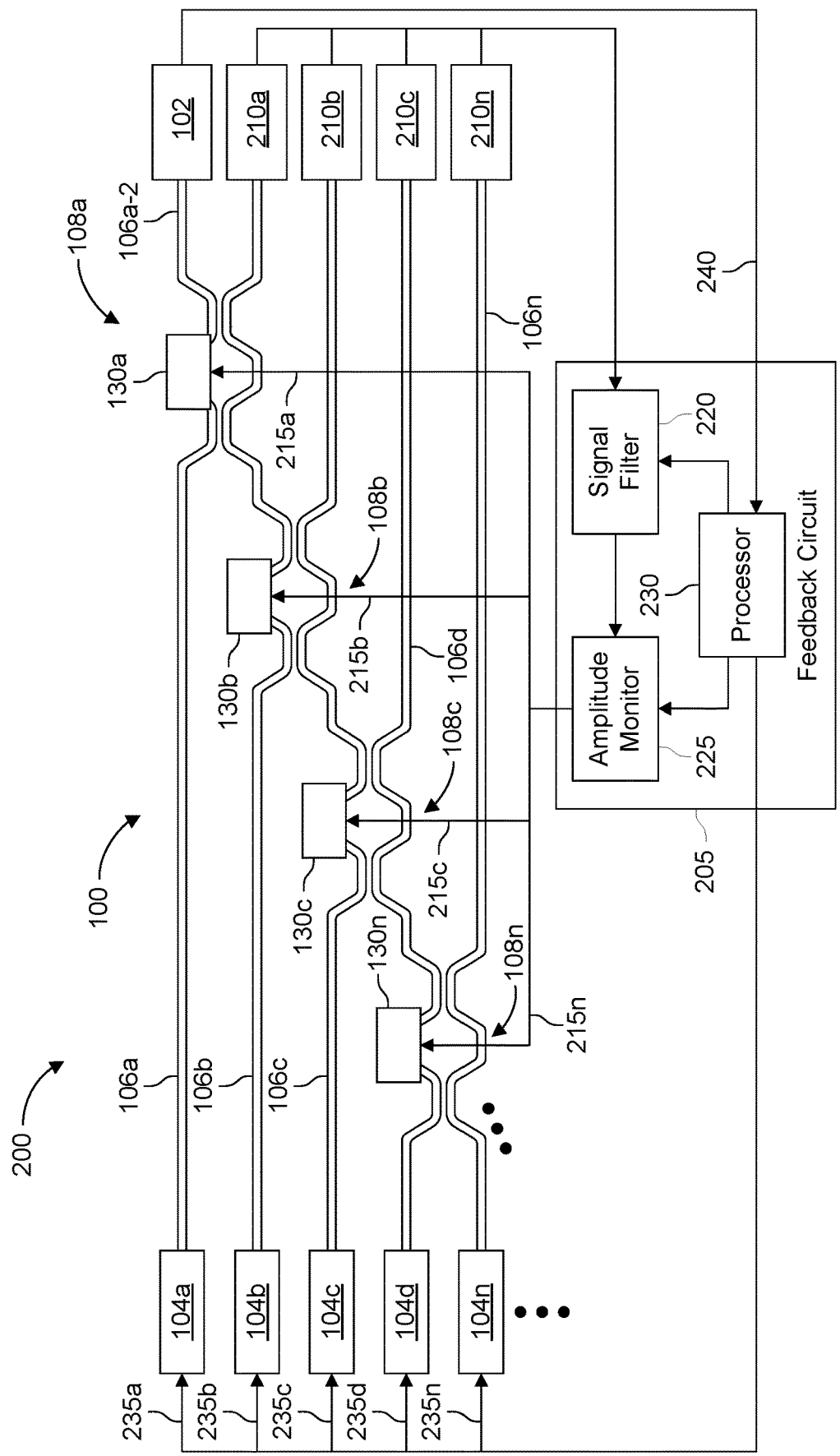
FIG. 2 depicts a schematic diagram of an optical source redundancy system in accordance with implementations disclosed herein.

FIG. 2 depicts a schematic diagram of an optical source redundancy system 200 including an example feedback circuit 205 in accordance with implementations disclosed herein. The system 200 includes the optical device 100 that provides for optical source redundancy for PIC 102, as described above in connection with FIG. 1, and feedback circuit 205 coupled to the optical device 100. The optical device 100 shown in FIG. 2 is substantially similar to optical device 100 of FIG. 1, except that terminators 110 are replaced with monitor devices, such as photodetectors 210*a-n* (collectively referred to herein as photodetectors 210) of the feedback circuit 205 optically coupled to output ends of the waveguides 106. Each photodetector 210 is configured to detect an optical signal propagating on a respective waveguide 106. The detected optical signal can be monitored and utilized by the feedback circuit 205 for generating control signals 215*a-n* (collectively referred to herein as control signals 215) for tuning optical switching devices 108. For example, feedback circuit 205 may be configured to achieve efficient steering of an optical signal, originating from desired optical sources 104, onto the second section 106*a*-2 of waveguide 106 by adjusting control signals 215 until an optical signal detected at each photodetector 210 is minimized. When the optical signal at each photodetector 210 is minimized, the optical signal supplied to the second section 106*a*-2 of waveguide 106, and ultimately to PIC 102, will be maximized.

Photodetectors 210 (also referred to as photosensors) detect light or other electromagnetic radiation through photoelectric or photochemical effects. Photodetectors 210 may be semiconductor-based photodetectors that utilize a p-n junction that converts an optical signal into current by absorbing that optical signal which electron-hole pairs in a depletion region, thereby generating a current. Photodetectors 210 may be implemented as photodiodes, phototransistors, photoresistors, or other photodetector devices known in the art.

In operation, waveguides 106 supply a corresponding optical signal to respective photodetectors 210. Each photodetector 210 is biased by the optical signal, which generates a signal representing characteristics (e.g., intensity, amplitude or the like) of the detected optical signal, which can be used to monitor the optical signal propagating on each waveguide 106, for example, via feedback circuit 205. The generated signal can be an analog signal in some examples, while in other examples the photodetectors 210 may be configured to digitize detected optical signals for processing by digital components. The characteristics represented by the generated signal may be proportional to optical signals received by each photodetector 210 from a respective waveguide 106. The signal can be utilized as feedback on the performance of each optical switching devices 108. For example, steering of an optical signal originating from desired optical sources 104 onto the second section 106*a*-2 of waveguide 106 may be achieved by adjusting control signals 215, based on the signal generated by each photodetector 210, until the characteristic represented by the generated signal from a respective photodetector 210 is minimized. When the characteristics are minimized, the optical signal at the PIC 102 will be maximized.

In an illustrative example, the optical signal originating from fourth optical source 104*d* can be steered to PIC 102 based on tuning optical switching devices 108, as described above in connection with FIG. 1. As a result, optical signals emitted by the first, second, third, and $N^{th}$ optical sources 104*a-c*, n are received at photodetectors 210*a-d*, respectively. The characteristics represented by each signal generated by each photodetector 210 can be minimized, which maximizes the optical signal, which originated from fourth optical source 104*d*, at PIC 102. For example, fourth optical switching device 108*n* may be tuned to minimize the optical signal detected by photodetector 210*d*, which maximizes the optical signal that originated from fourth optical source 104*d* transmitted to third optical switching device 108*c*. Third optical switching device 108*c* is then tuned to minimize the optical signal detected by photodetector 210*c*, which maximizes the optical signal that originated from fourth optical source 104*d* transmitted toward second optical switching device 108*d*. The procedure repeats until the optical signal at PIC 102 is maximized. Thus, fourth optical source 104*d* can supply an optical signal to the PIC 102, for example, in a case that optical sources 104*a-c* have failed or otherwise malfunctioned.

In some implementations, the generated signal can be passed through a signal filter 220 configured to filter out signals above and/or below a certain threshold. In some examples, the signal filter 220 can comprise a high pass filter configured to filter out frequencies higher than a target high frequency. In some examples, the signal filter 220 can comprise a bandpass filter configured to filter out frequencies within a range of high frequencies. In various embodiments, a "high frequency" comprises any bandwidth frequency higher than a desired full width at half maximum (FWHM) of the lasing mode of the optical signal. In some implementations, the signal filter 220 may comprise one or more filter stages. As a non-limiting example, the signal filter 220 can comprise a low-pass filter stage configured to filter out frequencies below a certain threshold and a high-pass filter stage configured to filter out frequencies above a certain threshold. In various embodiments, the signal filter 220 can be configured to filter out a sinusoidal signal from the signal generated by the photodetectors 210.

An amplitude monitor 225 may be configured to measure the amplitude of an input signal from the signal filter 220. The amplitude monitor 225 can be configured to identify the amplitude value for the filtered input signal. Depending on the determined amplitude, the amplitude monitor 225 may be configured to send one or more control signals 215 to one or more optical switching devices 108 to adjust the operating parameters of the one or more optical switching devices 108 to steer an input optical signal to a desired output (e.g., to a first output or second output as described in connection with FIG. 1). As a non-limiting example, the amplitude monitor 225 may send a control signal 215 to one or more of the phase-shift mechanisms 130 to induce a change to the refractive index of a coupled waveguide and/or induce a phase delay in light propagating in the coupled waveguide. Thus, control signals 215 may be used to tune the phase difference within the phase-shift mechanisms 130 so to steer each input optical signal InA and InB to a desired output. In an example implementation, the amplitude monitor 225 may send a control signal 215 to one or more electrical contacts of one or more phase-shift mechanisms 130 to control the operational characteristics by applying a bias voltage to the one or more electrical contacts connected to the one or more phase-shift mechanisms 130, which generates a phase difference between optical signals propagating in the branches of the one or more phase-shift mechanisms 130.

In various implementations, the photodetectors 210, the signal filter 220, and/or the amplitude monitor 225 may be communicatively coupled to a processor 230 (collectively, "the feedback circuit 205"). The processor 230 may be configured to control the operation of the feedback circuit 205. In some embodiments, the processor 230 may be configured to receive input from each component and send a corresponding command to the next component. In various embodiments, one or more of the photodetectors 210, the signal filter 220, and/or the amplitude monitor 225 may be included within the processor 230. In various embodiments, the amplitude monitor 225 may be configured to send a control signal 215 to a signal generator or other computing component configured to generate one or more control signals for controlling the one or more optical switching devices 108.

In various implementations, the processor 230 may be configured to send one or more signals 235*a-n* (collectively referred to herein as control signals 235) to one or more optical sources 104. Signals 235 can be generated responsive to detecting that an optical source 104 has failed or otherwise malfunctioned. For example, as alluded to above in connection with FIG. 1, PIC 102 may determine that a characteristic of a received optical signal is below a threshold, for example, through use of a photodetector include in PIC 102. The photodetector included in PIC 102 may be similar to photodetectors 210. In some scenarios, a determination that the characteristic is below the threshold can be indicative that the optical source 104 emitting the optical signal has failed or is otherwise malfunctioning. PIC 102 may be configured to generate a notification signal 240 that is transmitted to processor 230 to notify feedback circuit 205 that the current optical source 104 has failed or malfunctioned. Responsive to the notification, processor 230 may generate a signal 235 to activate a next optical source 104, which starts emitting an optical signal. The control signals 235 in this case may be referred to as an activation signal. In some cases, the next optical source 104 may be the successively next optical source 104. Responsive to the activation signal, control signals 215 may be generated to tune the optical switching devices 108 and steer the optical signal to the PIC 102. In various examples, processor 230 may also generate a notification signal 240 to deactivate the failed optical source 104. The control signal 235 in this case may be referred to as a deactivation signal.

Phase tuning according to the implementations disclosed herein may be achieved through many different approaches. For example, phase-shift mechanisms described throughout the present disclosure, such as phase-shift mechanisms 130 of FIGS. 1 and 2, may be provided as any mechanism capable of inducing a phase shift in light propagating through the respective waveguide. For example, as alluded to above, phase-shift mechanism 130 can be configured to tune the resonant frequency by inducing a change in the refractive index of coupled waveguide over a certain length, for example, through carrier injection (e.g., charge accumulation), charge depletion, or changing the temperature of a portion of the waveguide.

In some implementations, the phase-shift mechanisms 130 comprises one or more heating elements (e.g., resistive heaters, or the like) that can be operated to change the temperature of a coupled waveguide (e.g., a branch of MZI 112). The heating element may be, for example, a resistor (e.g., metal component) electrically coupled to a portion of the waveguide 106 (e.g., a portion or all of a branch of MZI 112). A current may then be applied to the heating elements via contact electrode, which generates heat transferred to the respective waveguide causing a change in temperature. Control of the current may tune the temperature so to tune the phase of the optical signal propagating therein. A change in phase or phase shift ($\Delta\varphi$) can be induced based on a change in temperature as follows:

$$\Delta\varphi = \frac{2\pi L_H}{\lambda_0} \frac{dn}{dT} \Delta T \qquad \text{Eq. 1}$$

Where $L_H$ is a length of the heating element coupled to the respective waveguide, $dn/dT$ is a thermo-optic coefficient dependent on the material from which the respective waveguide is formed (e.g., indicative of a change in refractive index with the response to temperature), $\Delta T$ is the change in temperature of the respective waveguide, and $\lambda_0$ is the free space wavelength of the light. Thus, applying or subtracting heat from the respective waveguide 106 will induce a change in phase.

Figure 3A:
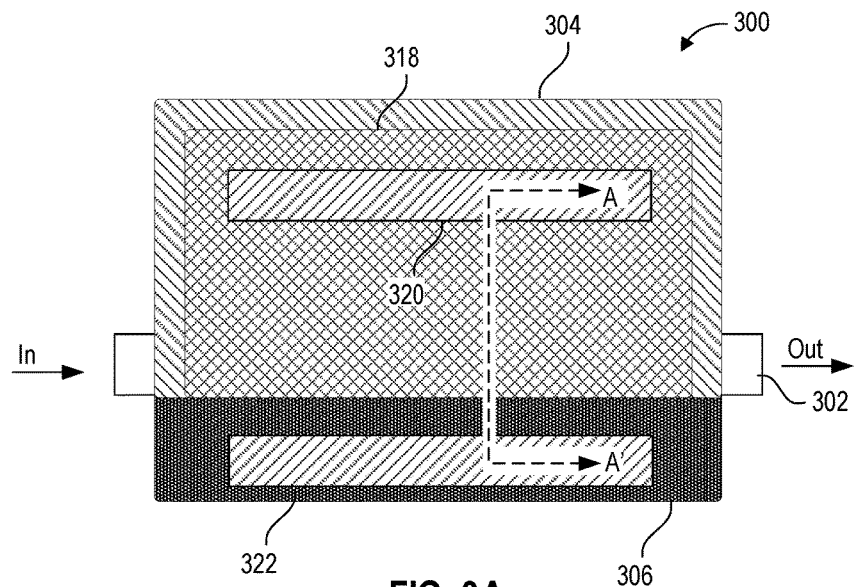
FIGS. 3A and 3B illustrate an example implementation of a phase-shift mechanism, which may be included in the optical device of FIG. 1, in accordance with implementations disclosed herein.
Figure 3B:
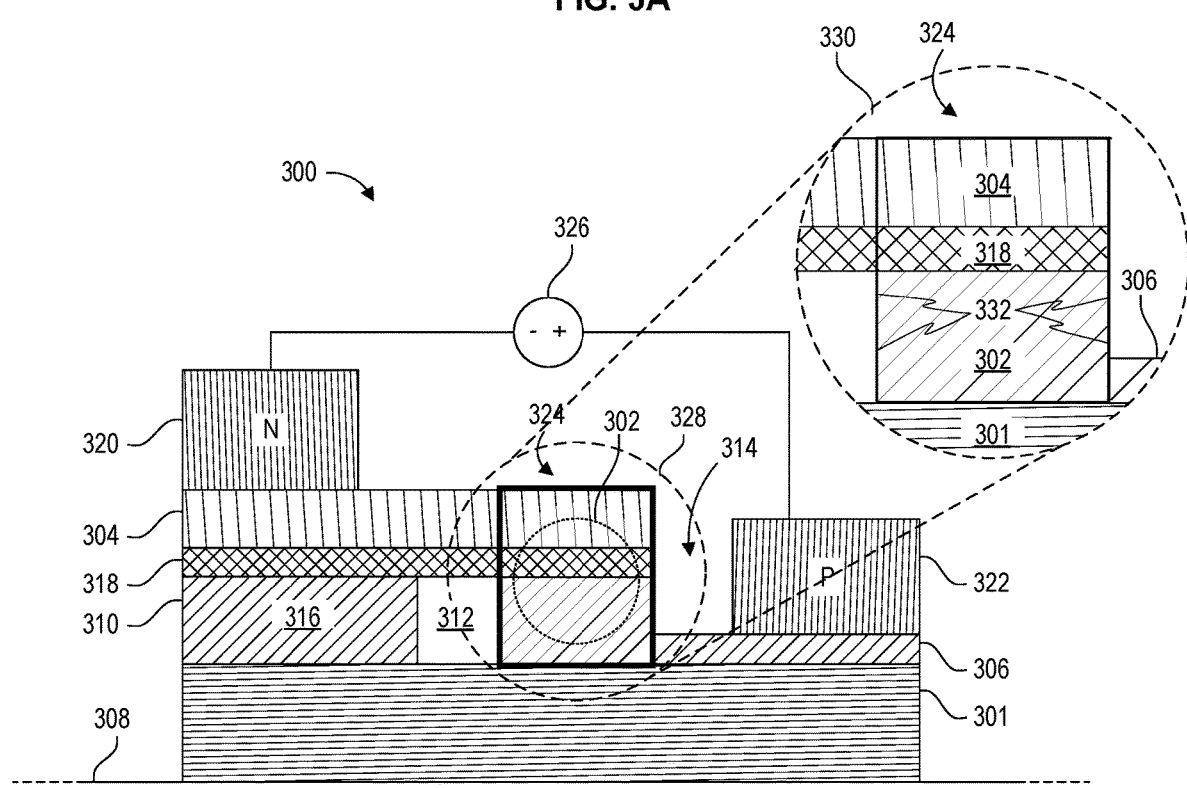

FIGS. 3A and 3B illustrate an example implementation of a phase-shift mechanism in accordance with implementations disclosed herein. FIGS. 3A and 3B illustrate an example hybrid metal-oxide-semiconductor (MOS) optical modulator 300 that may be implemented as a phase-tuning mechanism, for example, the phase-shift mechanisms 130 of FIGS. 1 and 2. FIG. 3A is a top-down view of the optical modulator 300 and FIG. 3B is a section view of the hybrid MOS optical modulator 300 taken along a line A-A' shown in FIG. 3A.

The optical modulator 300 includes an optical waveguide 302, a cathode 304 comprising a first material and formed in the optical waveguide 302, and an anode 306 comprising a second material that is different from the first material and formed in the optical waveguide 302. The anode 306 adjoins the cathode 304. A capacitor (also referred to as a capacitive structure) is defined between the anode 306 and the cathode 304. The optical waveguide 302 may be, for example, a portion of one of waveguides 106 of FIG. 1 that is coupled to the optical modulator 300 (e.g., the portion of waveguide 302 that is overlapped with the anode 306 and cathode 304 as shown in FIG. 3A). In the case that optical switching devices 108 is implemented as a MZI 112, the optical waveguide 302 may be a portion of the waveguide 106 forming one of the branches of the MZI 112 (e.g., branch 126a as shown in FIG. 1).

In some examples, a substrate 301 comprises oxide (also referred to as a buried oxide layer) grown on an underlying layer 308, which may be provided as silicon. In an example, substrate 301 may comprise silicon dioxide (SiO$_2$). Other examples of materials for substrate 301 may include, but are not limited to, Silicon Nitride (Si3N$_4$), Aluminum oxide (Al2O$_3$), Hafnium Dioxide (HfO$_2$), diamond, silicon carbide (SIC), or combinations thereof. A silicon layer 310 is formed on the substrate 301. A trench 312 separates the optical modulator 300 into two portions 314 and 316. The first portion 314 comprises the anode 306. The optical waveguide 302 is formed in the anode 306. The cathode 304 is integrated to the second portion 316. In various embodiments, the cathode 304 comprises a layer of Group III-V material as the first material. A MOS capacitor 324 (also referred to as a MOSCAP or MOSCAP structure) is defined between the cathode 304 and the anode 306.

A dielectric 318 is formed between the cathode 304 and the anode 306. The dielectric 318 may be an electrically insulating material formed between the cathode 304 and anode 306 of the MOS capacitor 324, and the polarization of the dielectric 318 by an applied electric field may increase the surface charge of the MOS capacitor 324 for a given electric field strength. The dielectric 318 can be native oxides of the cathode or the anode or both, or can be external dielectric materials such as high-k dielectrics or polymers which can be formed by deposition, oxidation, wafer bonding or other dielectric coating methods.

The cathode 304 may comprise negatively-doped Group III-V material (such as indium phosphide (InP), germanium (Ge), gallium arsenide (GaAs), aluminum gallium arsenide (AlGaAs), indium gallium arsenide (InGaAs), indium arsenide (InAs), or combinations thereof) and the anode 306 may comprise positively-doped silicon. In an illustrative example, cathode 304 comprises GaAs. A cathode electrode 320 is disposed on the cathode 304 and an anode electrode 322 is disposed on the anode 306. When a voltage is applied between the electrodes, carrier accumulation, depletion or inversion can occur around dielectric 318. Due to the capacitor region overlapping with the optical waveguide, carrier concentration change may lead to changes in refractive index and propagation loss within waveguide 302. By biasing the voltage applied between the electrodes, the refractive index may be modulated accordingly, thereby inducing optical intensity modulation, phase shift modulation, and attenuation.

In a case where modulator 300 is implemented as phase-shift mechanism 130, an optical signal propagating through optical waveguide 302 is modulated, attenuated, and phase shifted based on changes in the waveguide modal refractive index induced by applying a voltage biasing to the MOS capacitor 324. The modulated and attenuated optical signal continues along the optical waveguide 302, for example, to a coupler (e.g., directional coupler 132a of FIG. 1).

For example, FIG. 3A includes a DC power source 326. The DC power source 326 acts as a signal source and has a negative terminal connected to the cathode electrode 320 and a positive terminal connected the anode electrode 322. This results in a migration of negative charges from the cathode 304 toward a side of the optical waveguide 302 adjacent to the cathode 304, and migration of positive charges ("holes") from the anode 306 to an opposite side of the waveguide 302 (also referred to herein as accumulation mode). In other examples the polarity of the DC power source 326 may be reversed. Reversing the polarity of the DC power source 326 causes a migration of negative charges from the waveguide 302 toward cathode electrode 320, and migration of holes from the waveguide 302 toward anode electrode 322 (also referred to herein as depletion mode).

The MOS capacitor 324 forms at the boundary between the Group III-V material of the cathode 304 and the underlying capacitor portion of the intrinsic silicon or other Group IV material. A thin layer of silicon and the Group III-V oxides (e.g., dielectric 318) forms naturally at this boundary and serves as a dielectric for the capacitor. In some examples, this thin layer has a thickness on a nanoscale, for example, a few nanometers thick. In some examples, steps need not be taken to encourage the formation of dielectric 318. In other examples, the formation of dielectric 318 may be stimulated, for example by elevating the temperature, exposing the materials to an oxygen-rich atmosphere, or other suitable technique. Materials that can be used to form the dielectric 318 may include, but not limited to, SiO$_2$, Si$_3$N$_4$, Al$_2$O$_3$, HfO$_2$, polyimide, benzocyclobutene (BCB), or combinations thereof.

As discussed previously, the MOS capacitor 324 is formed along the optical waveguide 302 so that charge carriers that accumulate/deplete on either side of the capacitor dielectric have the effect of changing the index of refraction of the optical waveguide and waveguide loss (e.g., loss or attenuation of propagated signal power in the waveform).

The MOS capacitor 324 can operate in accumulation, depletion or inversion mode (e.g., accumulation of electrons at the dielectric layer in addition to presence of holes). As discussed above, a DC voltage can be applied between an anode and cathode, causing a thin charge layer to accumulate, deplete, or invert on both sides of the dielectric layer 318. The resulting change in free carrier density causes a change in refractive index n of the optical waveguide 302, which is manifested as a change in the effective refractive index of the optical mode ($\Delta n_{eff}$). The amount of change or modulation in the effective refractive index ($\Delta n_{eff}$) and associated change in optical losses ($\Delta \alpha$) can be described with as follows:

$$\Delta n_{eff} = \frac{-q^2 \lambda_0^2}{8\pi^2 c^2 n\varepsilon_0} \left( \frac{\Delta N_e}{m_{ce}^*} + \frac{\Delta N_h}{m_{ch}^*} \right) \quad \text{Eq. 2}$$

$$\Delta \alpha = \frac{-q^3 \lambda_0^2}{4\pi^2 c^3 n\varepsilon_0} \left( \frac{\Delta N_e}{m_{ce}^{*2} \mu_e} + \frac{\Delta N_h}{m_{ch}^{*2} \mu_h} \right) \quad \text{Eq. 3}$$

Where q is electrical charge applied to the cathode 304 and the anode 306, c is the speed of light in vacuum, so is the permittivity of free space, n is the material refractive index, ΔN represents a change in carrier density such that $\Delta N_e$ represents the change in carrier density in terms of electrons that $\Delta N_h$ represents the change in carrier density in terms of holes, m*represents the relative effective mass of electrons ($m^*_{ce}$) and holes ($m^*_{ch}$), $\mu_h$ represents the hole mobility, $\mu_e$ represents the electron mobility, and $\lambda_0$ is the free space wavelength.

Figure 4B:
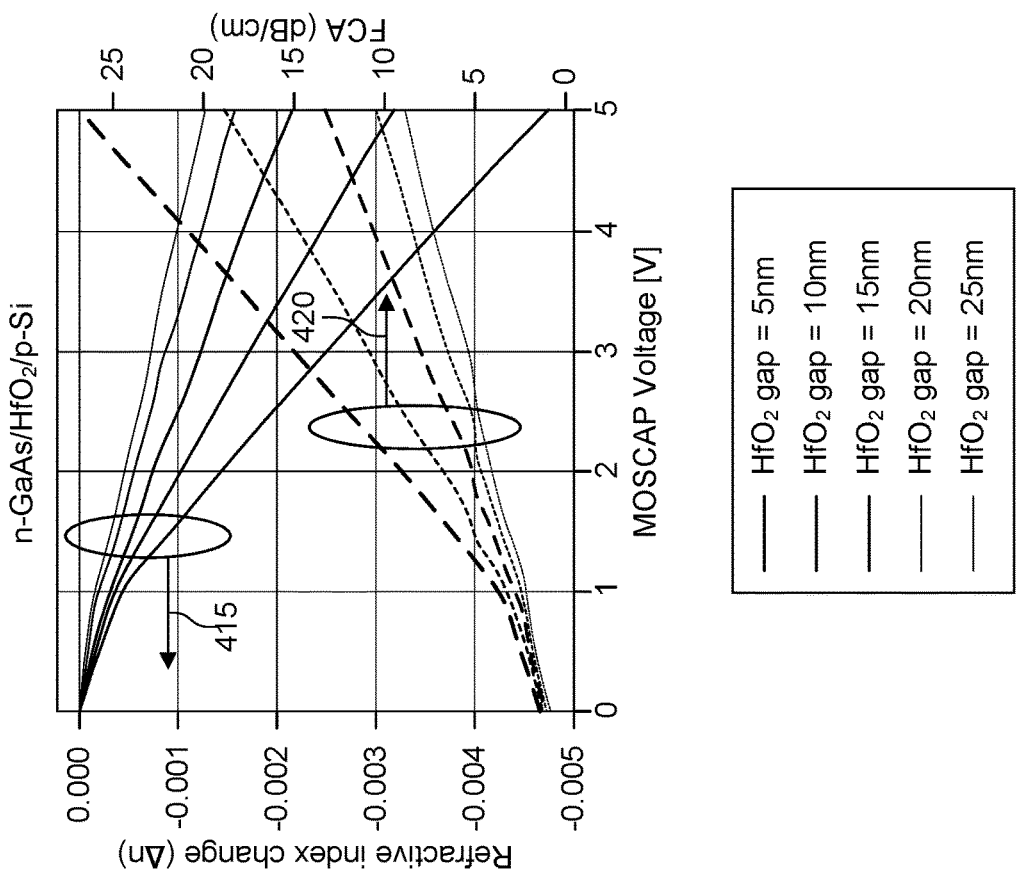
FIGS. 4A and 4B show simulated relationships between voltage applied to an example of the phase-shift mechanism of FIGS. 3A and 3B plotted against a change in modal refractive index and a change in free carrier absorption (FCA).
Figure 4A:
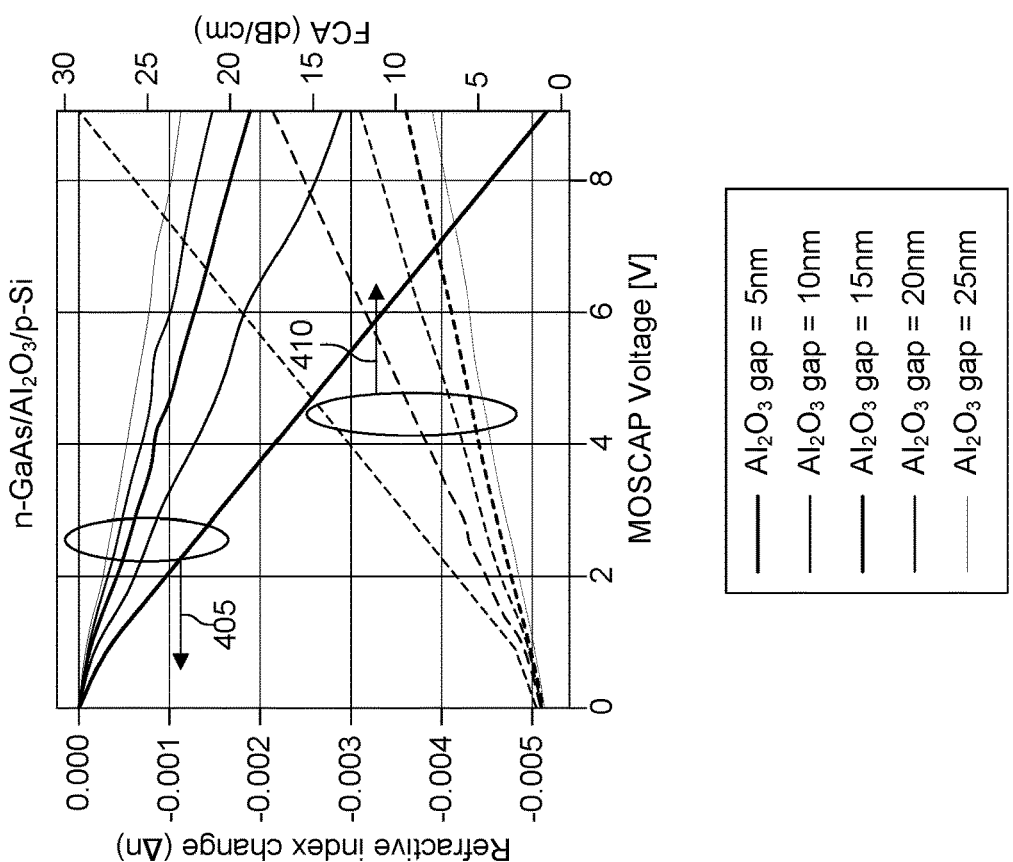

FIGS. 4A and 4B show simulated relationships between voltage applied to the optical modulator 300 of FIGS. 3A and 3B for different dielectric materials plotted against the change in refractive index ($\Delta n_{eff}$) of the optical mode of the waveguide (left axis) and change in free carrier absorption (FCA) (right axis). FIG. 4A illustrates the simulation results for dielectric 318 formed of $Al_2O_3$, while FIG. 4B illustrates simulated results for dielectric 318 formed of $HfO_2$. As indicated by pointer 405 and 415 of FIGS. 4A and 4B, respectively, solid lines show the change in refractive index ($\Delta n_{eff}$) for thicknesses of dielectric 318 (e.g., different gaps between cathode 304 and anode 306). Pointers 410 and 420 indicate that dashed lines provide for changes in FCA for each dielectric thickness.

An optical phase shift (Δφ) at the end of the capacitor depends on the magnitude of the voltage-induced $\Delta n_{eff}$, the device length L, and the optical wavelength A. In this example, the optical phase shift can be calculated as $\Delta \varphi = 2\pi \Delta n_{eff} L \lambda$. Thus, the optical phase of the light within optical waveguide 302 may be shifted based on the voltage-induced $\Delta n_{eff}$. In various examples, the waveguide loss in silicon and the Group III-V material may also change simultaneously as carrier density changes, and control of the change in the waveguide loss can be used as an optical attenuator. For example, changes in waveguide loss may be controlled based on the change in carrier density, which may impart attenuation of the waveguide losses. The attenuated waveguides losses can be used to modulate a signal.

As described above, the depletion or accumulation of charges at the interfacial layer (e.g., dielectric 318) results in a change of free carrier density that changes the local refractive index of the waveguide 302. As described above, the change in the refractive index of waveguide 302 may be used to induce a phase shift (e.g., offset the phase) of light propagating in waveguide 302. In a case where a phase-shift mechanism 130 of FIGS. 1 and 2 are implemented as an MOCAP-loaded MZI, the phase-shift based on a voltage bias to the MOS capacitor 324 may be used to tune relative phase difference between an optical signal propagating in a first branch of the MZI 112 that is coupled to the optical modulator 300 and an optical signal propagating in a second branch of the MZI 112.

Figure 5:
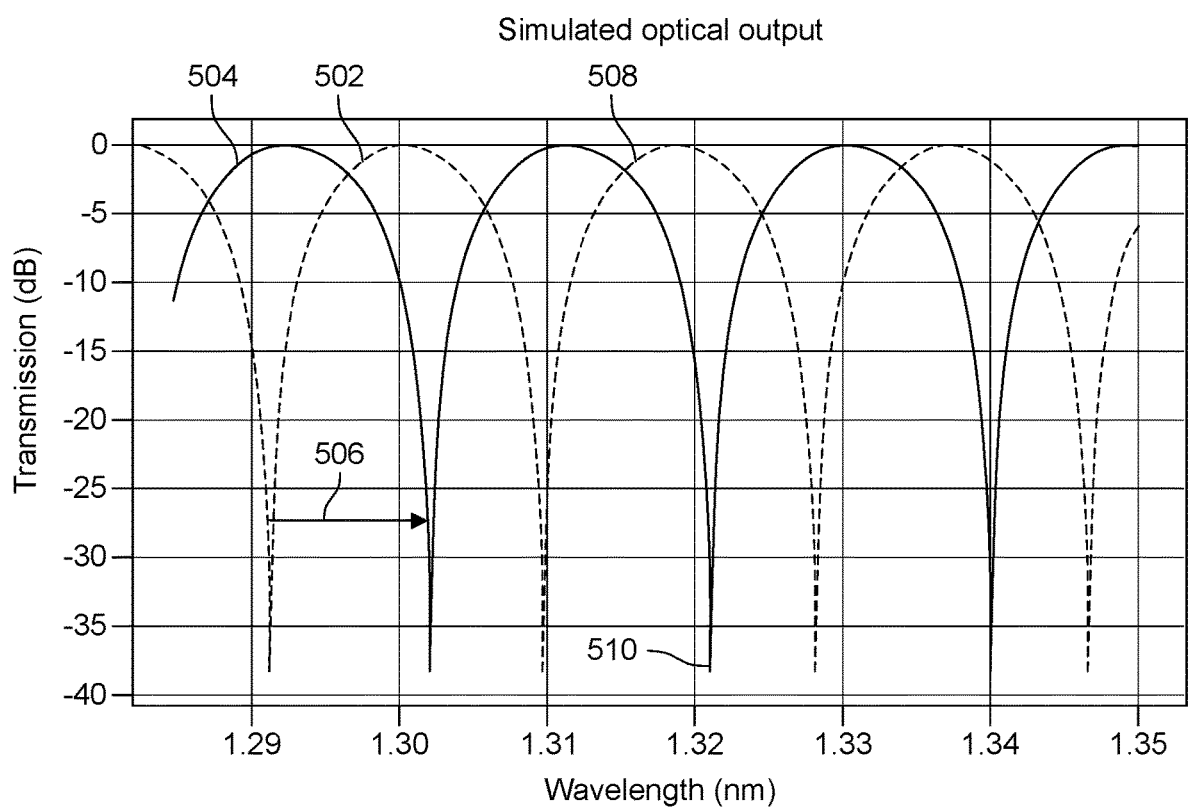
FIG. 5 depicts simulated optical outputs from an example of the phase-shift mechanism of FIGS. 3A and 3B.

FIG. 5 depicts an example simulated optical output from an example MOS capacitor-loaded MZI according to an example implementation. Particularly, FIG. 5 depicts simulated optical responses 502 and 504 that are output from, with reference to FIG. 1 for example, optical switching device 108a comprising MZI 112a and phase-shift mechanisms 130a implemented as optical modulator 300 that is coupled to branch 126a (e.g., a MOS capacitor-loaded MZI 112). The optical responses 502 and 504 are simulated using an optical signal that is input into an input of MZI 112 and depict output transmittance as a function of wavelength at an output of the MZI 112 under an unbiased condition and a biased condition, respectively. That is, optical response 502 represents a case where no voltage bias is applied to the optical modulator 300 and optical response 504 represents a case where a voltage bias is applied to optical modulator 300.

As shown by arrow 506 of FIG. 5, applying a bias to the optical modulator 300 causes a change in local refractive index of branch 126a which causes the optical response shift. For example, the peaks and valleys of the transmitted output shift under bias. Thus, for an optical signal input into MZI 112a having a given wavelength, the optical power output from the first output 122a can be shifted based on the applied voltage, which permits for switching the optical signal output from first output 122a. For example, if the optical signal input into the MZI 112 has a wavelength of 1.32 µm, the output signal according to FIG. 5 is at a maximum value at peak 508 when voltage is not applied. If a voltage bias is applied, the transmitted optical power approaches a minimum optical power at valley 510. Thus, applying a voltage to optical modulator 300 provides for optical switching.

According to some implementations, the capacitive structure of the example optical modulators (such as optical modulator 300) may be utilized for detecting optical signals without extracting light out of the optical device. For example, the MOS capacitor structure 324 can function as a photodetector based on mid-bandgap defects that convert absorbed photons (e.g., from a received optical signal) into photo-generated carriers. For ease of understanding, the following description will be made with reference to optical modulator 300 of FIGS. 3A and 3B.

Referring back to FIGS. 3A and 3B, the structure of the MOS capacitor 324 comprises optical waveguide 302 (e.g., a portion of a waveguide 106 coupled to optical modulator 300) formed therein. The waveguide 302 may have one or more defect sites 332 as depicted in an enlarged view 330 of a portion 328 of the optical modulator 300. The term "defect sites" as used herein may refer to imperfections in the bulk of the material of the waveguide 302, surface imperfections at the boundaries of the waveguide 302, or both. In some examples, the defect sites 332 may be resulted from imperfections in the manufacturing process as well as intentionally created. The existence of the defect sites 332 may absorb photons and cause the generation of free charge carriers relative to the intensity of the optical signal impinging thereon inside the waveguide 302. A conductance of the waveguide 302 depends on the amount of the free charge carriers, such that an increase in the optical signal causes an increase in the conductance of the waveguide 302. Accordingly, upon application of voltage bias across the optical modulator 300, the defect sites 332 can cause the generation of free charge carriers relative to the intensity of the optical signal inside the waveguide 302. The changes in the conductance within waveguide 302 may cause variations in current passing through the waveguide 302 which can be utilized to monitor the intensity of the optical signal propagating in waveguide 302.

Figure 6:
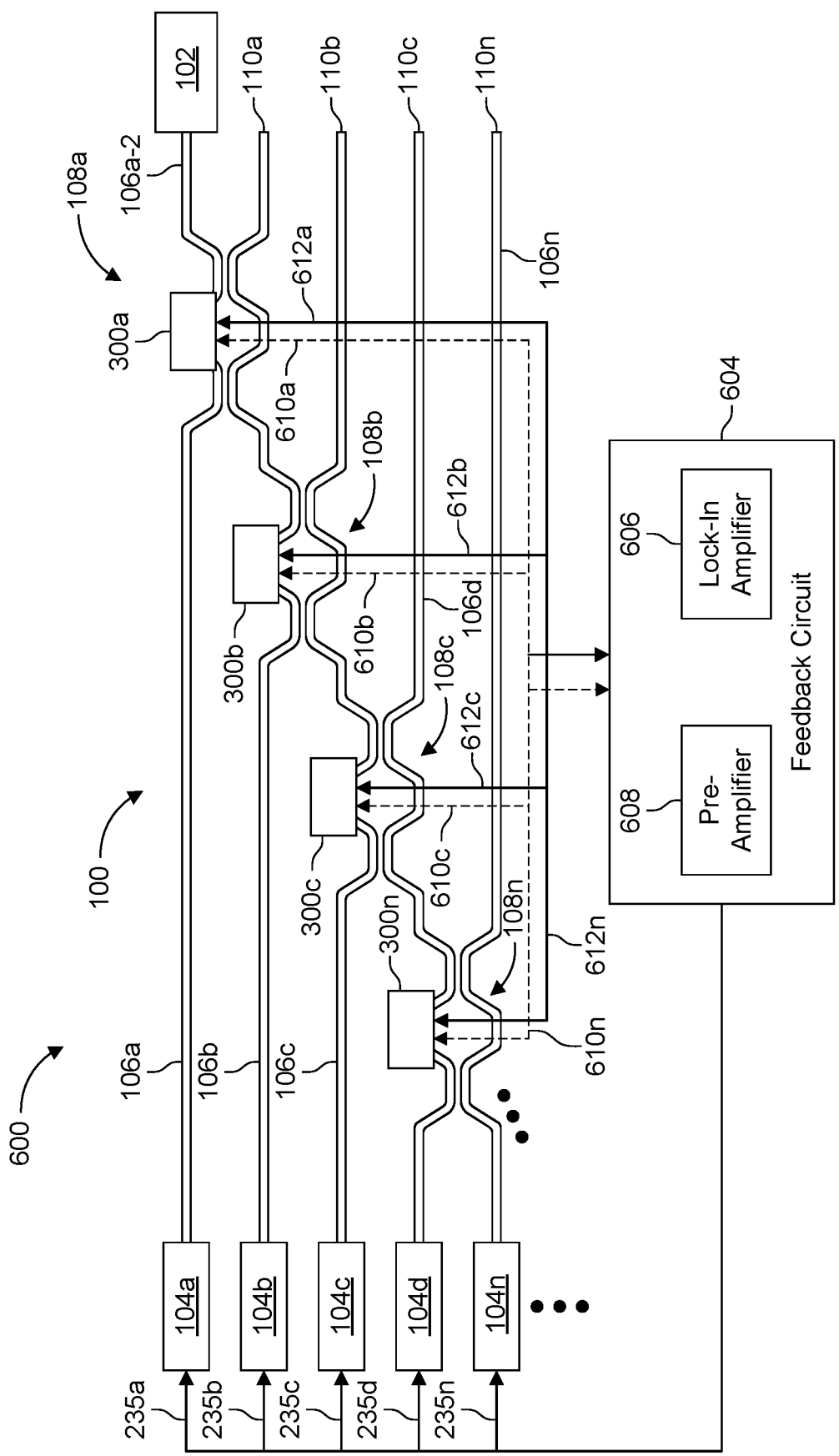
FIG. 6 depicts a schematic diagram of another optical source redundancy system in accordance with an example implementation.

FIG. 6 depicts a schematic diagram of another optical source redundancy system 600 in accordance with an example implementation, where phase-shift mechanisms may be implemented as monitor devices used for monitoring optical signals based on defect sites included therein. The system 600 includes the optical device 602 connected to a feedback circuit 604. The optical device 602 is substantially similar to optical device 100 of FIG. 1, except that each optical switching devices 108a-n comprise optical modulators 300a-n (collectively referred to herein as optical modulators 300) of FIGS. 3A and 3B implemented as a phase-shift mechanism. Thus, like reference numbers used in FIG. 6 represent those structures and components described above in reference to one or more of FIGS. 1, 2, and 3A-3B. The optical modulators 300 may be implemented as monitor devices according to a first bias applied to a given optical modulator 300 in one case and as phase tuners according to a second bias in another case, as illustrated below.

As described above, each optical modulator 300 comprises MOS capacitor 324 coupled to a portion of a respective waveguide 106. These portions of waveguide 106 may represent waveguide 302 of FIGS. 3A and 3B, each of which comprises one or more defect sites 332 as depicted in an enlarged view 330 of FIG. 3B. As detailed above, the defect sites 332, upon application of voltage across respective MOS capacitor 324 of each optical modulator 300, may cause the generation of free charge carriers relative to the intensity of the optical signal inside the optical switching device 108. The generation of free charge carriers results in a change in the conductance, and the change in the conductance results in variations in current passing through MOS capacitor 324. For example, a decrease in current passing through MOS capacitor 324 is a result of proportional decrease in conductance because the intensity of the optical signal has also decreased, which means fewer free charge carriers are generated to change the conductance.

The feedback circuit 604 is configured to monitor intensity of optical signals propagating within each optical switching devices 108 based on the detecting variations in current passing through MOS capacitor 324 of respective optical switching devices 108. The feedback circuit 604 may be electrically coupled to each MOS capacitor 324 at monitoring sites. For example, feedback circuit 604 may be coupled using electrical connection 610a-n (collectively referred to as electrical connections 610) to respective electrodes 320 and 322, which may represent monitoring sites either collectively or individually. In some examples, the feedback circuit 604 may cause MOS capacitor 324 to generate electrical signals indicative of the optical signal intensities at propagating within waveguide 302, respectively. To affect the generation of the electrical signals, in some examples, the monitoring circuit may include a lock-in amplifier 606 and a preamplifier 608. In some examples, the lock-in amplifier 606 may generate a reference variable voltage signal, for example, a sinusoidal signal. For a given MOS capacitor 324, the lock-in amplifier 606 may determine a frequency of the reference variable voltage signal based on a conductance of waveguide 302 in the given MOS capacitor 324 and a capacitance of the given MOS capacitor 324. In an example, the lock-in amplifier 606 may determine a frequency ($F_0$) of the reference variable voltage signal based on an example relationship of equation (1).

$$F_0 = \frac{G_{WG}}{2\pi * C} \qquad \text{Eq. 4}$$

where, $G_{WG}$ represents the conductance of the waveguide region in the given MOS capacitor 324 and C represents the capacitance of the given MOS capacitor 324.

In certain other examples, the frequency ($F_0$) of the reference variable voltage signal may be set to any value greater than $$\frac{G_{WG}}{2\pi * C}.$$

The feedback circuit 604 may apply a reference variable voltage signal to one or more MOS capacitors 324 via electrical connections 610. As previously noted, the conductance of the given waveguide 302 may change depending on the intensities of the optical signal therein. Consequently, the current flowing through the given waveguide 302 within may also vary. In particular, the magnitude of electrical current generated by a given MOS capacitor 324 may be influenced by the light intensities within the waveguide 302, because the waveguide conductance of a waveguide 302 changes due to the presence of free carriers created by the absorption of photons at the defect sites 332 within waveguide 302.

The feedback circuit 604 may receive the electrical signal generated within a given MOS capacitor 324 via electrical connections 610 and measure the electrical signals (e.g., electrical currents). The electrical signals are in turn representative of intensities of the optical signals inside a waveguide 302 formed in the MOS capacitor 324 within which the electrical signals were generated. In some examples, the electrical currents received by the feedback circuit 604 from the given MOS capacitor 324 may be weak in strength. The preamplifier 608 may amplify the electrical currents for further processing by the lock-in amplifier 606.

During operation, an optical signal can be received by one of optical switching devices 108, which passes through the respective waveguide 302 of a respective MOS capacitor 324 comprised in the one optical switching device 108. To monitor the light intensity, the feedback circuit 604 may apply the reference variable voltage signal (e.g., sometimes referred to herein as the first bias) to electrodes 320 and 322 and measure electrical current at the one of the electrode (e.g., electrode 320 in some examples). As previously noted, changes in the signal intensities inside the respective waveguide 302 may cause changes in the conductance of the respective waveguide 302. Consequently, the current flowing through the respective MOS capacitor 324 may vary. Such current flowing through the respective MOS capacitor 324 may be monitored by the feedback circuit 604 at the one of the electrodes.

The one optical switching device 108 receives the optical signal directly from an optical component along the optical pathways of optical device 100. For example, the optical component may be a preceding optical switching device 108 of the cascaded structure or one of optical sources 104. Thus, feedback circuit 604 can monitor signal intensities output from a preceding optical component based on monitoring current flowing through the respective MOS capacitor 324 of the one optical switching device 108. As such, the detected optical signal can be monitored and utilized for generating control signals 612a-n (collectively referred to herein as control signals 612), which are substantially similar to control signals 215 of FIG. 2 utilized for tuning optical switching devices 108 so to direct an optical signal to PIC 102.

In an illustrative example, an optical signal originating from first optical source 104a is received by optical switching device 108a, which comprises optical modulator 300a coupled to a portion of first waveguide 106a. The optical modulator 300a includes a MOS capacitor 324 comprising the portion of first waveguide 106a (e.g., waveguide 302), which contains defect sites 332. Feedback circuit 604 applies a first bias (e.g., reference voltage) and monitors intensities of the optical signal from first optical source 104a based on monitoring current flowing through the MOS capacitor 324 of optical modulator 300a. If feedback circuit 604 detects the current flowing through MOS capacitor 324 decreases below a threshold current or becomes negligible (e.g., indicative of the intensity of optical signal is below threshold intensity), this indicates that the first optical source 104a has malfunctioned and/or failed. The feedback circuit 604 can then generate control signal 235a and control signal 235b to deactivate first optical source 104a and activate second optical source 104b, respectively. Feedback circuit 604 can also generate control signal 612a to apply a second bias to tune optical switching device 108 to direct the optical signal emitted by second optical source 104b to the PIC 102, as described above in connection with FIGS. 1 and 2.

As another illustrative example, in a case where feedback circuit 604 determined that first optical sources 104a-c have failed, first optical source 104a can be activated via control signal 235c and fourth optical switching device 108n can be tuned via control signal 612n such that a maximum intensity of an optical signal is detected at third optical switching device 108c. For example, by applying the reference voltage (e.g., first bias) to MOS capacitor 324 of optical modulator 300c, feedback circuit 604 detects a maximum current passing through the MOS capacitor 324, which indicates maximum generation of free charge carriers and a maximum intensity. Then, third optical switching device 108c can be tuned by applying a subsequent voltage bias (e.g., second bias). While the third optical switching device 108c is tuned, the feedback circuit 604 monitors current passing through MOS capacitor 324 of the second optical switching device 108b, in part, by apply the reference voltage to MOS capacitor 324 of the optical switching device 108b. Third optical switching device 108c is tuned (e.g., by adjusting the second bias) until the feedback circuit 604 detects a maximum current (e.g., maximum photo-generated carriers) in MOS capacitor 324 of optical modulator 300b. This procedure repeats until the PIC 102 receives maximal optical power originating from fourth optical source 104d.

While not shown in FIG. 6, feedback circuit 604 may comprise one or more of feedback circuit 205 of FIG. 2. For example, feedback circuit 604 may include signal filter 220 configured to filter out electrical signals above and/or below a certain threshold, as described above. Feedback circuit 604 may also include amplitude monitor 225 configured to measure the amplitude of an input signal from the signal filter 220. In various implementations, feedback circuit 604 may be comprised or be communicatively coupled to processor 230, which can be configured to control the operation of the feedback circuit 604. For example, the processor 230 may be configured to receive input from each component and send a corresponding command to the next component. Furthermore, in some implementations, PIC 102 may be configured to transmit notification signal 240, as described above, to the feedback circuit 604, thereby notifying feedback circuit 604 that an optical source 104 has malfunctioned and/or failed.

The use of the optical modulator 300 to detect optical power along a waveguide may obviate the need for separate photodetectors to monitor the optical signals, resulting in a compact footprint and reduced complexity of the proposed optical system. However, using optical modulators 300 to detect optical power may be weak and can require the use of the lock-in amplifier, which can be more complicated. Accordingly, in some implementations, photodetectors may be provided at ends of waveguides 106 (e.g., photodetectors 210 of FIG. 2) and used in placed of (e.g., as described in connection with FIG. 2) or in conjunction with MOS capacitor 324 of optical modulators 300 to provide for optical source redundancy. For example, each optical switching device 108 can be utilized to detect photo-generated free charge carriers, as described above, and outputs from each waveguide 106 can be detected by photodetectors 210. Based on both detections, control signals 215 may be generated to provide for tuning the optical switching devices 108. The use of photodetectors 210 in conjunction with detecting photo-generated free charge carriers may assist with compensating for power or wavelength differentials that can occur as the optical sources ages. For example, over time, the optical sources 104 age due to heat. As a result, in the case of laser sources, the lasing wavelength and output power will change as well (e.g., power and/or wavelength differentials). By monitoring the outputs via photodetectors 210 (and/or optical modulators 300), wavelength changes and/or power drops can be detected, and the feedback circuitry utilized to adjust bias applied to the optical switching laser to compensate for the changes and/or drops.

Additional details on capacitive structures functioning as photodetectors based on converting absorbed photons into photo-generated carriers can be found, for example, in U.S. Pat. No. 11,442,235 and U.S. application Ser. No. 17/454,410, each of which is incorporated herein by reference in its entirety.

While the foregoing description in connection with FIG. 6 was made with reference to optical modulator 300 of FIGS. 3A and 3B, implementations disclosed herein are not so limited. For example, optical switching devices 108 may comprise any capacitive structure containing defect sites therein which can be used to absorb a received optical signal and generate free charge carriers for detecting optical signal intensities, the implementations disclosed herein are not limited to the specific example structures illustrated in FIGS. 3A and 3B.

Figure 7:
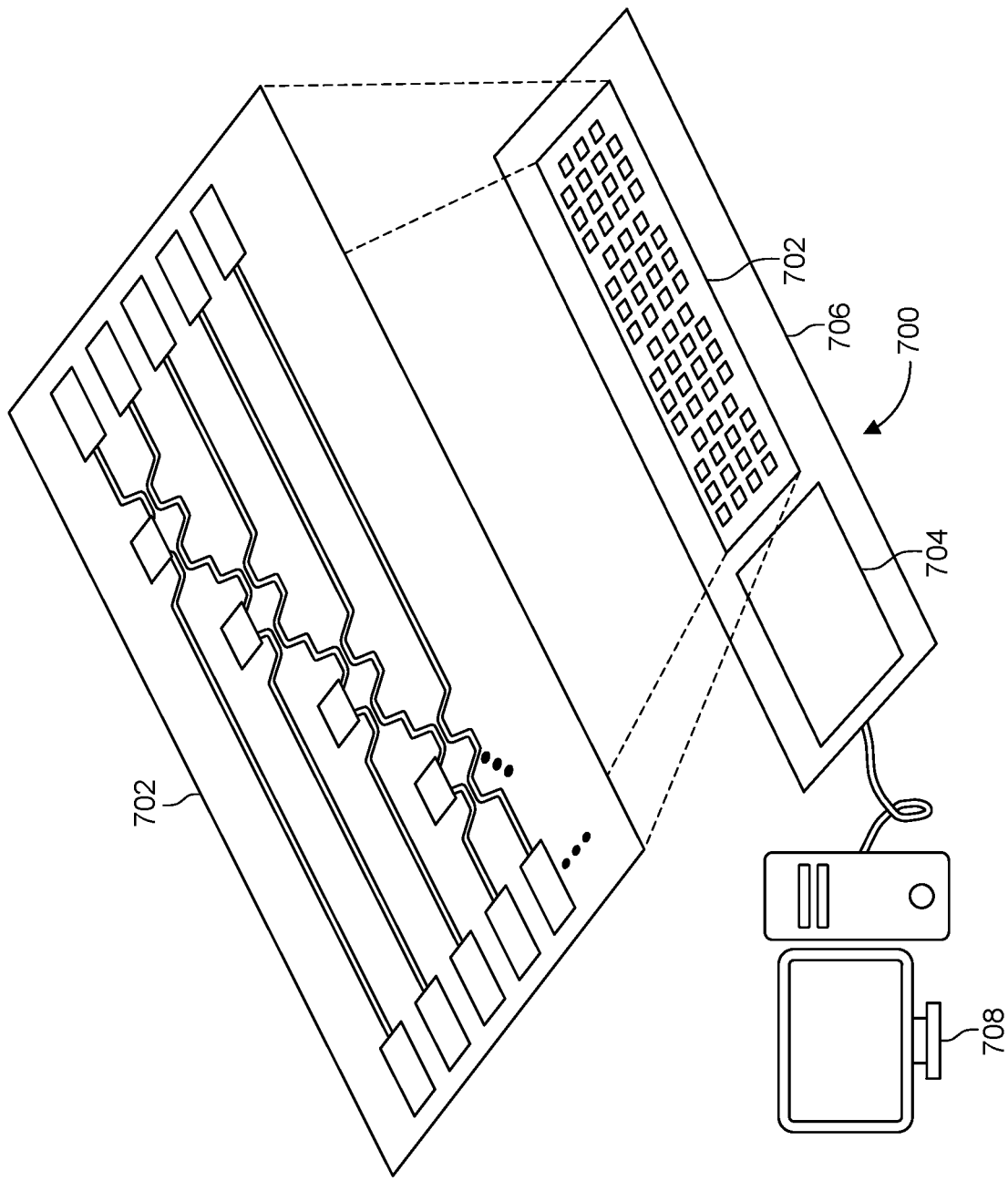
FIG. 7 illustrates an example packaged device comprising an optical source redundancy system, according to implementations disclosed herein, integrated with a controller.

FIG. 7 illustrates an example packaged device 700 comprising an optical source redundancy system 702 according to implementations disclosed herein integrated with a controller 704. The optical source redundancy system 702 can be fabricated, interconnected with the controller 704, both of which are mounted on a common printed-circuit board (PCB) 706.

Optical source redundancy system 702 may be implemented as any of the optical devices and/or optical source redundancy systems disclosed herein. For example, the optical source redundancy system 702 may be implemented as optical device 100 in some examples. In another example, optical source redundancy system 702 may be implemented as optical source redundancy system 200, optical source redundancy system 600, or a combination thereof.

The controller 704 may be implemented as an electronic circuit, such as, but not limited to, a processor, a field programmable gate array (FPGA), application specific integrated circuit (ASIC), programmable logic array (PLAs), programmable array logic (PALs), context processing definition language (CPDL), or other electronic circuits. The controller 704 may include a control circuit operatively coupled to the optical switching devices 108. Further, controller 704 may be communicatively coupled to the feedback circuits 205 and/or 604, depending on the implementation. The controller 704 may be an example processor 230, which may execute instruction to provide control signals to activate/deactivate optical sources 104 and tune optical switching devices 108 as set forth above in connection with FIGS. 1, 2, and 6. In some examples, the functionalities of the feedback circuits 205 and/or 604 may be integrated in the optical source redundancy system 702, respectively.

The packaged device 700 may be communicatively coupled (e.g., wired connection or wireless connection) with a computing system 708. The computing system 708 can be provided controlling the packaged device 700. The computing system 708 may be implemented as, for example, computer system 900 of FIG. 9.

Figure 8:
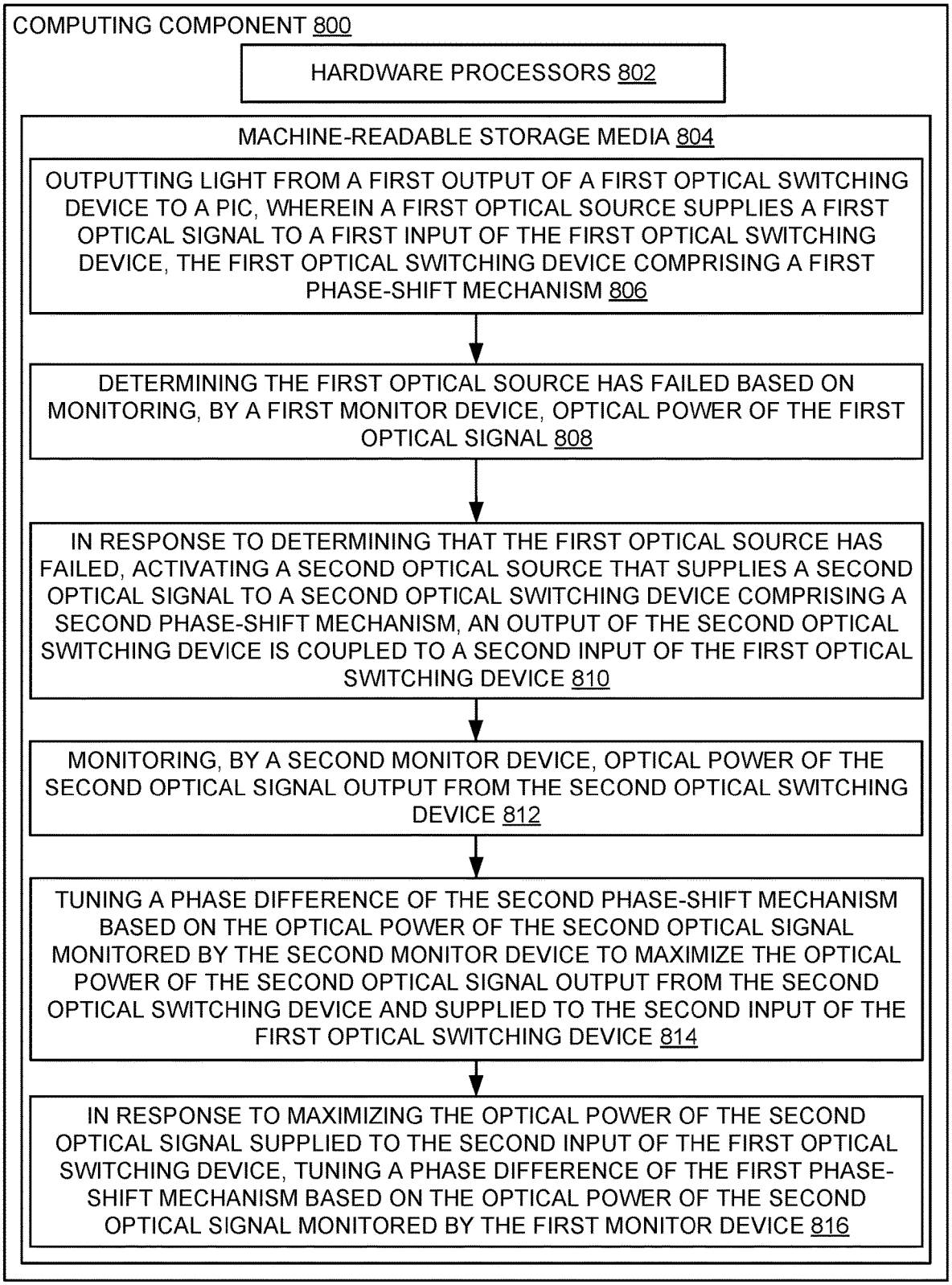
FIG. 8 is an example computing component that may be used to implement various features of optical source redundancy in accordance with the implementations disclosed herein.

FIG. 8 illustrates an example computing component that may be used to implement optical source redundancy in accordance with various embodiments. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-816, to control processes or operations for built in redundancy of an optical source for supplying an optical signal to, for example, a PIC. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-816.

Hardware processor 802 may execute instruction 806 to output light from a first output of a first optical switching device to a PIC. For example, as described above in connection with any one of FIGS. 1, 2, and 6, a first optical source supplies a first optical signal to a first input of the first optical switching device and the first optical switching device comprising a first phase-shift mechanism.

Hardware processor 802 may execute instruction 808 to determine the first optical source has failed based on monitoring, by a first monitor device, optical power of the first optical signal. For example, as described above in connection with any one of FIGS. 1, 2, and 6, the first monitor device may be provided as a photodetector comprised in the PIC and/or the first phase-shift mechanism. In either case, the first monitor device monitors the optical signal received from the first optical source to determine that the first optical source has failed.

Hardware processor 802 may execute instruction 810 to, in response to determining that the first optical source has failed, activate a second optical source that supplies a second optical signal to a second optical switching device. For example, a control signal may be provided to the second optical source to cause the second optical source to emit a second optical signal. As described above in connection with any one of FIGS. 1, 2, and 6, the second optical switching device comprises a second phase-shift mechanism and an output of the second optical switching device is coupled to a second input of the first optical switching device.

Hardware processor 802 may execute instruction 812 to monitor, by a second monitor device, optical power of the second optical signal output from the second optical switching device. For example, as described above in connection with any one of FIGS. 1, 2, and 6, the second monitor device may be provided as a photodetector coupled to a second output of the first optical switching device and/or the first phase-shift mechanism. In either case, the second monitor device monitors the optical signal output from the second optical switching device.

Hardware processor 802 may execute instruction 814 to tune a phase difference of the second phase-shift mechanism based on the optical power of the second optical signal monitored by the second monitor device to maximize the optical power of the second optical signal output from the second optical switching device and supplied to the second input of the first optical switching device. For example, as described in connection with FIG. 2, the second monitor device may be a photodetector that monitors an optical signal output from the first optical switching device. The second optical switching device is tuned to so to minimize the optical signal monitored by the second monitoring device, which indicates that a maximum optical signal is received at the PIC. In another example, as described in connection with FIG. 6, the second monitor device may be the first phase-shift mechanism that monitors an optical signal received from the second optical switching device based on photon-generated free charge carriers that induce a change in current in a capacitive structure of the first phase-shift mechanism. The second optical switching device is tuned to maximize the photon-generated free charge carriers, which indicates a maximum optical signal is received at the first phase-shift mechanism.

Hardware processor 802 may execute instruction 816 to, in response to maximizing the optical power of the second optical signal supplied to the second input of the first optical switching device, tuning a phase difference of the first phase-shift mechanism based on the optical power of the second optical signal monitored by the first monitor device. Instruction 816 may be similar to instruction 814 above, except that the first monitor device is utilized instead of the second monitor device. Thus, the second optical source can be output from the first optical switching device and into the PIC, at least in part, based on the tuning of phase differences of the first and second phase-shift mechanisms at instructions 816 and 814.

Figure 9:
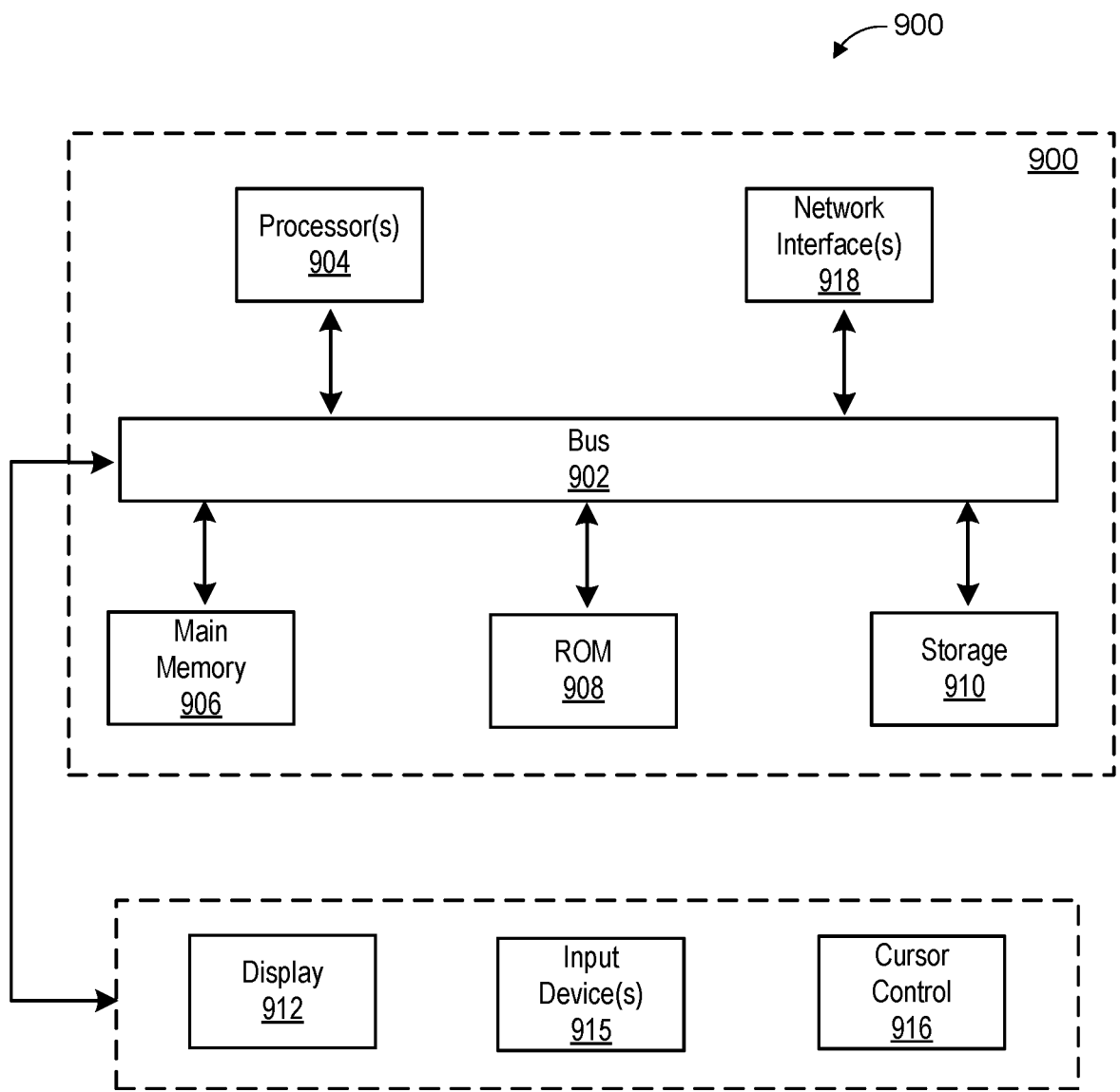
FIG. 9 is an example computer system that may be used to implement various features of optical source redundancy of the present disclosure.

FIG. 9 depicts a block diagram of an example computer system 900 in which various of the embodiments described herein may be implemented. The computer system 900 may be an example implementation of feedback circuit 205 and/or processor 230 of FIG. 2; feedback circuit 604 of FIG. 6, computing system 708 of FIG. 7, and/or computing component 800 of FIG. 8. The computer system 900 includes a bus 902 or other communication mechanism for communicating information, one or more hardware processors 904 coupled with bus 902 for processing information.

Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. For example, main memory 906 may store instructions 806-814 to be executed by processors 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a network interface 918 coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or wide area network (WAN) component to communicate with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 918, which carry the digital data to and from computer system 900, are example forms of transmission media.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical supply redundancy system comprising:
   a plurality of optical sources, the plurality of optical sources comprises at least a first optical source, a second optical source, a third optical source, and fourth optical source;
   a plurality of waveguides, the plurality of waveguide comprising at least a first waveguide optically coupled the first optical source, a second waveguide optically coupled the second optical source, a third waveguide optically coupled the third optical source, and a fourth waveguide optically coupled the fourth optical source;
   a plurality of optical switching devices, the plurality of optical switching devices comprising:
      a first optical switching device coupled to the first waveguide and the second waveguide,
      a second optical switching device coupled to the second waveguide and the third waveguide, and
      a third optical switching device coupled to the third waveguide and the fourth waveguide; and
   a plurality of phase-shift mechanisms, the plurality of phase-shift mechanisms comprising a first phase-shift mechanism coupled to the first optical switching device, a second phase-shift mechanism coupled to the second optical switching device, and a third phase-shift mechanism coupled to the third optical switching device,
   wherein the first waveguide supplies an optical signal from the fourth optical source to a photonic integrated circuit (PIC) based on tuning phase differences of each of the first, second, and third, phase-shift mechanisms.

2. The optical supply redundancy system of claim 1, wherein the second optical switching device is disposed between the first optical switching device and the plurality of optical sources and the third optical switching device is disposed between the second optical switching device and the plurality of optical sources.

3. The optical supply redundancy system of claim 1, wherein the plurality optical switching device comprises a first number of optical switching device and the plurality of optical sources comprises a second number of optical sources, wherein the first number is one less than the second number.

4. The optical supply redundancy system of claim 1, wherein the plurality of phase-shift mechanisms comprises a plurality of metal oxide semiconductor (MOS) capacitors, each MOS capacitors coupled to a respective waveguide of the plurality of waveguides.

5. The optical supply redundancy system of claim 4, wherein each of the MOS capacitors comprises:
   a cathode comprising a first material and formed in the respective waveguide of the plurality of waveguides;
   an anode formed in the respective waveguide of the plurality of waveguides, the anode comprising a second material different from the first material; and
   a dielectric disposed between the cathode and the anode, the dielectric comprises an oxide of the first material and an oxide of the second material, wherein the MOS capacitor is defined between the anode and the cathode, wherein the first material comprises a Group III-V material and the second material comprises silicon.

6. The optical supply redundancy system of claim 4, further comprising a feedback circuit connected to each of the MOS capacitors, the feedback circuit is configured to monitor an intensity of an optical signal within each of the plurality of waveguides based on the MOS capacitors, and tune the first, second, and third, phase-shift mechanisms is based on monitoring the intensities of the optical signals.

7. The optical supply redundancy system of claim 1, further comprising a plurality of photodetectors coupled to ends of the plurality of waveguides, wherein tuning the first, second, and third, phase-shift mechanisms is based on intensities of optical signals.

8. The optical supply redundancy system of claim 1, wherein optical signals emitted by the plurality of optical sources have a common wavelength.

9. The optical supply redundancy system of claim 1, wherein the plurality of optical switching devices comprise a plurality of Mach-Zehnder Interferometers (MZI), wherein:
   the first optical switching device is a first MZI having a first branch formed of the first waveguide and a second branch formed of the second waveguide,
   the second optical switching device is a second MZI having a first branch formed of the second waveguide and a second branch formed of the third waveguide,
   the third optical switching device is a third MZI having a first branch formed of the third waveguide and a second branch formed of the fourth waveguide, and
   wherein the first phase-shift mechanism is coupled to the first branch of the first MZI, the second phase-shift mechanism is coupled to the first branch of the second MZI, and the third phase-shift mechanism is coupled to the first branch of the third MZI.

10. An optical device comprising:
   a plurality of waveguides coupled to a plurality of optical sources configured to emit light at a common wavelength; and
   a plurality of optical switching devices, each optical switching device of the plurality of optical switching devices coupled to a pair of waveguides of the plurality of waveguides and each optical switching device of the plurality of optical switching devices comprising a Mach-Zehnder Interferometer (MZI) having a first branch comprising a capacitive structure coupled to one waveguide of the pair of waveguides and a second branch formed of another waveguide of the pair of waveguides,
   wherein an optical signal from a first optical source of the plurality of optical source is steered to an output of the optical device based on tuning phase differences of a subset of the MZIs by adjusting bias applied to the respective capacitive structures, and wherein an optical signal from a second optical source of the plurality of optical source is steered to the output of the optical device based on tuning phase differences of each of the MZIs by adjusting bias applied to the respective capacitive structures.

11. The optical device of claim 10, wherein a number of optical switching devices of the plurality of optical switching devices is one less than a number of waveguides of the plurality of waveguides.

12. The optical device of claim 10, further comprising a plurality of monitor devices, wherein the plurality of monitor devices comprises at least one of: one or more photodetectors and one or more capacitive structures of the plurality of optical switching devices.

13. The optical device of claim 10, wherein the plurality of optical switching devices comprises:
   a plurality of phase-shift mechanisms, wherein the plurality of phase-shift mechanisms are coupled to the first branches of the MZIs.

14. The optical device of claim 13, wherein the plurality of phase-shift mechanism comprises the capacitive structure.

15. The optical device of claim 10, wherein the capacitive structures of the plurality of optical switching devices comprises metal oxide semiconductor (MOS) capacitors.

16. The optical device of claim 15, further comprising:
   a feedback circuit connected to the MOS capacitors, the feedback circuit is configured to monitor an intensity of an optical signal within the plurality of waveguides based on the MOS capacitors, and operate the plurality of optical switching devices based on monitoring the intensities of the optical signals.

17. The optical device of claim 10, further comprising a plurality of photodetectors coupled to ends of the plurality of waveguides, wherein the plurality of optical switching devices are operated based on monitoring intensities of optical signals output by the plurality of waveguides.

18. The optical device of claim 10, wherein the plurality of waveguides comprises a first waveguide coupled to a photonic integrated circuit (PIC), wherein the first waveguide supplies an optical signal from the first optical source to the PIC based on tuning the phase differences of the subset of MZIs.

19. The optical device of claim 18, wherein the plurality of waveguides comprises a second waveguide coupled to the second optical source, wherein an optical signal from the second optical source is supplied to the second waveguide and is steered onto the first waveguide based on tuning the phase differences of the MZIs, wherein the first waveguide supplies the optical signal from the second optical source to the PIC.

20. The optical device of claim 10, wherein the optical signal from a second optical source travels along an optical path from the second optical source to the output, the optical path comprises each of the MZIs disposed consecutively along the optical path.

* * * * *